(12) United States Patent
Hobby et al.

(10) Patent No.: US 10,484,652 B2
(45) Date of Patent: *Nov. 19, 2019

(54) SMART HEADGEAR

(71) Applicant: Equisight LLC, Blue Ridge, TX (US)

(72) Inventors: Kenleigh C. Hobby, Chewelah, WA (US); Brendan Gowing, West Sussex (GB); David P. Matt, Missoula, MT (US)

(73) Assignee: Equisight LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,225

(22) Filed: Jul. 9, 2016

(65) Prior Publication Data

US 2017/0048496 A1 Feb. 16, 2017

Related U.S. Application Data

(63) Continuation of application No. 13/658,793, filed on Oct. 23, 2012, now Pat. No. 9,389,677.

(Continued)

(51) Int. Cl.
*H04N 7/18* (2006.01)
*H04N 5/225* (2006.01)
(Continued)

(52) U.S. Cl.
CPC ........... *H04N 7/185* (2013.01); *A42B 3/0433* (2013.01); *G06F 3/005* (2013.01); *H04B 1/385* (2013.01);
(Continued)

(58) Field of Classification Search
CPC ........ H04N 7/181; H04N 7/183; H04N 7/185; H04N 21/21805; H04N 5/2251;
(Continued)

(56) References Cited

U.S. PATENT DOCUMENTS 3,991,422 A 11/1976 Saotome
4,091,470 A 5/1978 Ryunoshin
(Continued)

FOREIGN PATENT DOCUMENTS

CA 1 116 801 1/1982
CN 2891719 Y 4/2007
(Continued)

OTHER PUBLICATIONS

Henrikkson, Sofia, "Concept Development of communications-enabled motorcycle helmet", KTH School of Industrial Engineering and Management, Machine Design dept., Feb. 27, 2009.
(Continued)

*Primary Examiner* — John Villecco
(74) *Attorney, Agent, or Firm* — Stites & Harbison, PLLC; David W. Nagle, Jr.

(57) ABSTRACT

In one embodiment of the invention, an apparatus for a smart helmet includes a camera, a communication subsystem, and a control subsystem. The control subsystem processes the video data from the camera and the communication subsystem transmits this video data from the smart helmet to a destination device.

16 Claims, 15 Drawing Sheets

Related U.S. Application Data

(60) Provisional application No. 61/628,151, filed on Oct. 24, 2011, provisional application No. 61/630,264, filed on Dec. 6, 2011.

(51) Int. Cl.
*A42B 3/04* (2006.01)
*G06F 3/00* (2006.01)
*H04B 1/3827* (2015.01)

(52) U.S. Cl.
CPC ... *H04N 5/2252* (2013.01); *H04B 2001/3866* (2013.01); *H04N 2005/2255* (2013.01); *H04R 2201/107* (2013.01)

(58) Field of Classification Search
CPC .......... H04N 5/2252; H04N 2005/2255; A42B 3/0406; A42B 3/042; A42B 3/0426; A42B 3/0433; H04B 1/385; H04B 2001/3866
See application file for complete search history.

(56) References Cited

U.S. PATENT DOCUMENTS

| | | | |
|---|---|---|---|
| 4,539,715 A | 9/1985 | Clement | |
| 5,570,150 A | 10/1996 | Yoneyama et al. | |
| 5,886,739 A | 3/1999 | Winningstad | |
| 6,028,627 A | 2/2000 | Helmsderfer | |
| 6,043,837 A * | 3/2000 | Driscoll, Jr. | H04N 5/2628 |
| | | | 348/36 |
| 6,182,116 B1 | 1/2001 | Namma et al. | |
| 6,292,213 B1 | 9/2001 | Jones | |
| 6,564,380 B1 | 5/2003 | Murphy | |
| 6,698,021 B1 | 2/2004 | Amini et al. | |
| 6,704,044 B1 * | 3/2004 | Foster | A42B 1/24 |
| | | | 348/157 |
| 6,798,392 B2 * | 9/2004 | Hartwell | A42B 3/046 |
| | | | 345/158 |
| 6,819,354 B1 * | 11/2004 | Foster | H04N 7/183 |
| | | | 348/157 |
| 6,891,566 B2 | 5/2005 | Marchese | |
| 7,186,159 B1 * | 3/2007 | Baxter | A42B 1/12 |
| | | | 2/422 |
| 7,302,644 B2 | 11/2007 | Holtz et al. | |
| 7,382,244 B1 | 6/2008 | Donovan et al. | |
| 7,487,112 B2 | 2/2009 | Barnes, Jr. | |
| 7,671,893 B2 | 3/2010 | Li et al. | |
| 7,710,452 B1 | 5/2010 | Lindberg | |
| 7,764,308 B2 | 7/2010 | Kusaka et al. | |
| 7,812,842 B2 | 10/2010 | Gordon | |
| 7,881,715 B2 | 2/2011 | Kirani et al. | |
| 7,956,892 B2 | 6/2011 | Frederick | |
| 8,001,623 B2 | 8/2011 | Gertsch et al. | |
| 8,020,220 B2 * | 9/2011 | McElroy | A42B 3/04 |
| | | | 2/467 |
| 8,166,573 B1 | 5/2012 | Chung et al. | |
| 8,319,845 B2 | 11/2012 | Ortiz | |
| 8,589,488 B2 | 11/2013 | Huston et al. | |
| 8,638,368 B2 | 1/2014 | Frederick | |
| 8,797,165 B2 | 8/2014 | Greenwald et al. | |
| 8,831,677 B2 | 9/2014 | Villa-Real | |
| 9,024,972 B1 | 5/2015 | Bronder et al. | |
| 9,143,667 B1 * | 9/2015 | Liverman | H04N 5/2253 |
| 9,219,768 B2 | 12/2015 | Hobby et al. | |
| 9,389,677 B2 * | 7/2016 | Hobby | G06F 3/005 |
| 9,445,639 B1 * | 9/2016 | Aloumanis | A42B 3/0453 |
| 9,713,756 B1 * | 7/2017 | Tran | A63B 71/06 |
| 10,219,571 B1 * | 3/2019 | Aloumanis | G08G 1/166 |
| 10,257,434 B2 * | 4/2019 | Arnold | G06F 3/16 |
| 2002/0021354 A1 | 2/2002 | Suzuki et al. | |
| 2002/0120939 A1 | 8/2002 | Wall et al. | |
| 2002/0154417 A1 * | 10/2002 | Wallerstein | G02B 13/06 |
| | | | 359/725 |
| 2002/0184641 A1 | 12/2002 | Johnson et al. | |
| 2003/0043191 A1 | 3/2003 | Tinsley et al. | |
| 2003/0071766 A1 | 4/2003 | Hartwell et al. | |
| 2003/0080878 A1 | 5/2003 | Kirmuss | |
| 2003/0133008 A1 * | 7/2003 | Stephenson | H04N 5/2251 |
| | | | 348/47 |
| 2003/0163827 A1 | 8/2003 | Purpura | |
| 2004/0078825 A1 | 4/2004 | Murphy | |
| 2005/0078195 A1 | 4/2005 | VanWagner | |
| 2005/0162381 A1 | 7/2005 | Bell et al. | |
| 2005/0168485 A1 | 8/2005 | Nattress | |
| 2005/0179811 A1 | 8/2005 | Palatov | |
| 2006/0050929 A1 | 3/2006 | Rast et al. | |
| 2006/0072007 A1 | 4/2006 | Gilor | |
| 2006/0277666 A1 * | 12/2006 | Gertsch | A42B 3/04 |
| | | | 2/424 |
| 2007/0022445 A1 | 1/2007 | Arseneau et al. | |
| 2007/0135979 A1 | 6/2007 | Plante | |
| 2007/0188612 A1 | 8/2007 | Carter | |
| 2007/0219686 A1 | 9/2007 | Plante | |
| 2008/0082311 A1 | 4/2008 | Meijer et al. | |
| 2008/0106597 A1 | 5/2008 | Amini et al. | |
| 2008/0170838 A1 | 7/2008 | Teetzel et al. | |
| 2008/0192117 A1 * | 8/2008 | Shanks | H04N 7/20 |
| | | | 348/157 |
| 2009/0013052 A1 | 1/2009 | Robarts et al. | |
| 2009/0058988 A1 * | 3/2009 | Strzempko | G06T 3/4038 |
| | | | 348/36 |
| 2009/0059013 A1 | 3/2009 | Yu | |
| 2009/0109292 A1 * | 4/2009 | Ennis | A42B 3/042 |
| | | | 348/158 |
| 2009/0237564 A1 | 9/2009 | Kikinis et al. | |
| 2010/0080418 A1 * | 4/2010 | Ito | G06K 9/00228 |
| | | | 382/103 |
| 2010/0182436 A1 | 7/2010 | Boman et al. | |
| 2010/0225758 A1 | 9/2010 | Mashiah | |
| 2010/0245585 A1 | 9/2010 | Fisher et al. | |
| 2011/0030021 A1 | 2/2011 | Campagna et al. | |
| 2011/0069146 A1 | 3/2011 | Wang et al. | |
| 2011/0069147 A1 * | 3/2011 | Lin | G03B 37/04 |
| | | | 348/36 |
| 2011/0128347 A1 | 6/2011 | Theobald | |
| 2011/0140913 A1 | 6/2011 | Montenero | |
| 2011/0182257 A1 * | 7/2011 | Raveendran | H04H 20/61 |
| | | | 370/329 |
| 2011/0197327 A1 * | 8/2011 | McElroy | A42B 3/04 |
| | | | 2/2.5 |
| 2012/0026300 A1 | 2/2012 | Kakiuchi et al. | |
| 2012/0113153 A1 | 5/2012 | Casner | |
| 2012/0198603 A1 | 8/2012 | Gertsch et al. | |
| 2012/0206565 A1 * | 8/2012 | Villmer | H04N 1/00 |
| | | | 348/36 |
| 2013/0033610 A1 | 2/2013 | Osborn | |
| 2013/0050401 A1 | 2/2013 | Tannhaeuser et al. | |
| 2013/0128046 A1 | 5/2013 | Gindin | |
| 2013/0141523 A1 * | 6/2013 | Banta | H04N 5/23238 |
| | | | 348/36 |
| 2013/0182116 A1 * | 7/2013 | Arima | H04N 7/181 |
| | | | 348/157 |
| 2013/0204930 A1 | 8/2013 | Hobby et al. | |
| 2013/0314508 A1 * | 11/2013 | Arima | H04N 7/181 |
| | | | 348/47 |
| 2014/0000013 A1 | 1/2014 | Redpath et al. | |
| 2014/0020159 A1 | 1/2014 | Teetzel et al. | |
| 2014/0075655 A1 * | 3/2014 | Ratner | A42B 3/042 |
| | | | 2/422 |
| 2014/0189937 A1 | 7/2014 | Pietrzak et al. | |
| 2014/0348484 A1 * | 11/2014 | Erwin | A42B 3/042 |
| | | | 386/223 |
| 2014/0362244 A1 * | 12/2014 | Martin | H04N 5/23241 |
| | | | 348/211.2 |
| 2015/0124060 A1 | 5/2015 | Hasegawa et al. | |
| 2015/0138354 A1 | 5/2015 | Miller | |
| 2015/0145990 A1 | 5/2015 | Jones | |
| 2015/0271367 A1 * | 9/2015 | Musec | A42B 3/30 |
| | | | 348/376 |
| 2016/0080649 A1 * | 3/2016 | Bex | H04N 7/185 |
| | | | 348/36 |
| 2016/0241794 A1 * | 8/2016 | Lee | H04N 1/00204 |
| 2016/0248995 A1 * | 8/2016 | Mullins | H04N 7/185 |

(56) References Cited

U.S. PATENT DOCUMENTS

| | | | |
|---|---|---|---|
| 2016/0249020 A1* | 8/2016 | Mingo | H04N 5/23206 |
| 2016/0344984 A1* | 11/2016 | Fitzgerald | H04N 5/7491 |
| 2017/0353658 A1* | 12/2017 | Colin | H04N 5/23238 |
| 2018/0014597 A1* | 1/2018 | Cooke | A42B 3/0426 |
| 2018/0249087 A1* | 8/2018 | Arnold | G06F 3/16 |
| 2018/0330527 A1* | 11/2018 | Corcoran | H04N 5/23293 |
| 2018/0332219 A1* | 11/2018 | Corcoran | H04N 5/23293 |

FOREIGN PATENT DOCUMENTS

| | | | |
|---|---|---|---|
| CN | 202304608 U | 7/2012 | |
| CN | 202424926 U | 9/2012 | |
| CN | 203618853 U | 6/2014 | |
| CN | 203633569 U | 6/2014 | |
| DE | 32 32 762 | 4/1983 | |
| DE | 19650442 A1 | 6/1998 | |
| DE | 10062406 A1 | 12/2002 | |
| DE | 20214241 | 12/2002 | |
| DE | 102009012450 | 9/2010 | |
| EP | 0 150 876 | 8/1985 | |
| EP | 0 279 086 | 8/1988 | |
| EP | 1103194 | 5/2001 | |
| GB | 2446724 | 8/2008 | |
| GB | 2446724 A * | 8/2008 | H04N 5/247 |
| KR | 1414411 B1 | 7/2014 | |
| WO | WO 1998/023177 | 6/1998 | |
| WO | WO 2003/026452 | 4/2003 | |
| WO | WO 2004/019717 | 3/2004 | |
| WO | WO 2007/059575 | 5/2007 | |
| WO | WO 2010/090473 | 8/2010 | |
| WO | WO 2010090473 A2 * | 8/2010 | A42B 3/042 |
| WO | WO 2011/027190 | 3/2011 | |
| WO | WO 2011/027190 A1 * | 3/2011 | |

OTHER PUBLICATIONS

Notification of Transmittal or the Declaration, International Search Report, Written Opinion of the ISR, and Search History for PCT/US12/61755, dated Feb. 1, 2013.

Notification of Transmittal or the Declaration, International Search Report, Written Opinion of the ISR, and Search History for PCT/US12/68320, dated Apr. 5, 2013.

Office Action dated Apr. 1, 2014 for U.S. Appl. No. 13/658,793; inventors Kenleigh C. Hobby et al.

Office Action dated Dec. 12, 2014 for U.S. Appl. No. 13/658,793; inventors Kenleigh C. Hobby et al.

Office Action dated Oct. 8, 2014 for U.S. Appl. No. 13/658,793; inventors Kenleigh C. Hobby et al.

Office Action dated Feb. 3, 2015 for U.S. Appl. No. 13/658,793; inventors Kenleigh C. Hobby et al.

Office Action dated Feb. 2, 2017 for U.S. Appl. No. 15/206,225; inventors Kenleigh C. Hobby et al.

Office Action dated Jun. 5, 2017 for U.S. Appl. No. 15/206,225; inventors Kenleigh C. Hobby et al.

Office Action dated Oct. 11, 2017 for U.S. Appl. No. 15/206,225; inventors Kenleigh C. Hobby et al.

Almudena Diaz et al.,Evaluating Video Streaming over GPRS/UMTS networks: A practical case,Apr. 2007;Vehicular Technology Conference,2007.VTC2007-Spring.IEEE 65th; pp. 624-628.

Garg et al.,Third generation (3G) mobile communication systems; Feb. 1999;1999 IEEE International Conference on Personal Wireless Communication; IEEE.

Office Action dated Jun. 5, 2015 for U.S. Appl. No. 13/658,793.

Office Action dated Feb. 3, 2015 for U.S. Appl. No. 13/658,793.

Office Action dated Oct. 26, 2015 for U.S. Appl. No. 13/658,793.

Notice of Allowance/Allowability dated Mar. 3, 2016 for U.S. Appl. No. 13/658,793.

Office Action dated Oct. 23, 2014 for U.S. Appl. No. 13/707,594; inventors Kenleigh C. Hobby et al.

Office Action dated May 11, 2015 for U.S. Appl. No. 13/707,594; inventors Kenleigh C. Hobby et al.

Notice of Allowance/Allowability dated Aug. 3, 2015 for U.S. Appl. No. 13/707,594; inventors Kenleigh C. Hobby et al.

Office Action dated Dec. 4, 2017 for U.S. Appl. No. 14/961,817; inventors Kenleigh C. Hobby et al.

Office Action dated Jun. 30, 2017 for U.S. Appl. No. 14/961,817; inventors Kenleigh C. Hobby et al.

\* cited by examiner

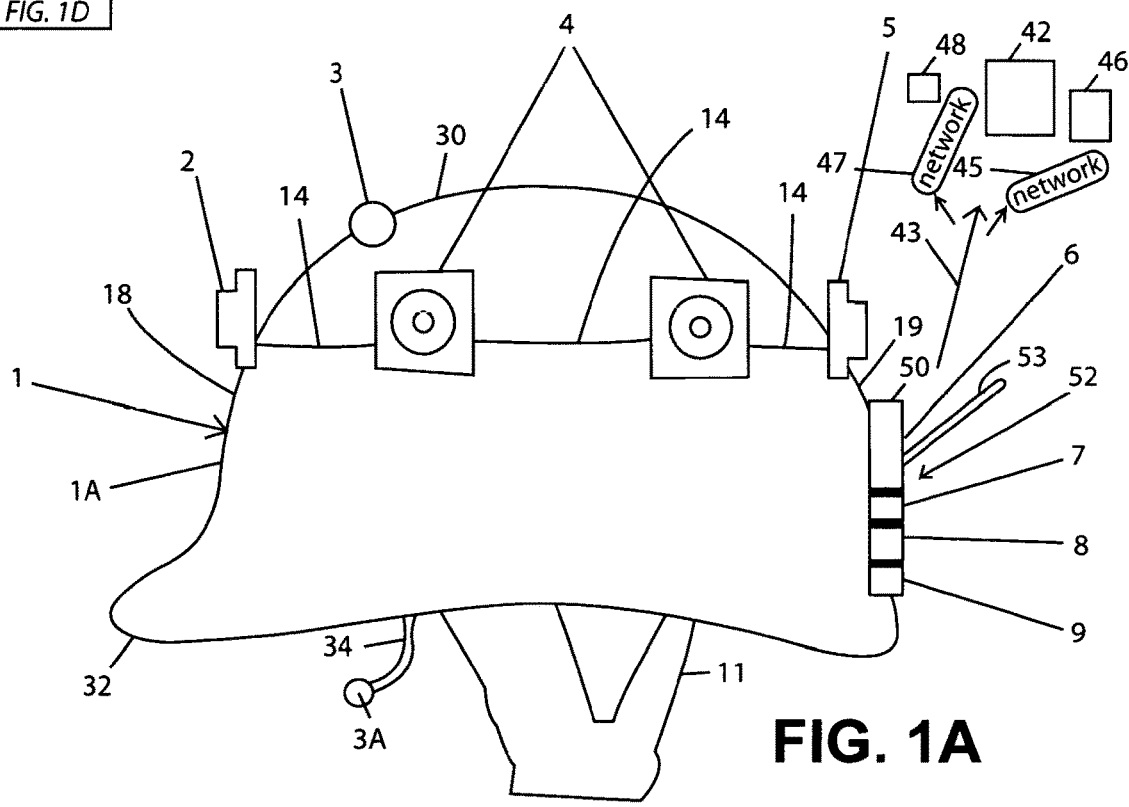
FIG. 1A
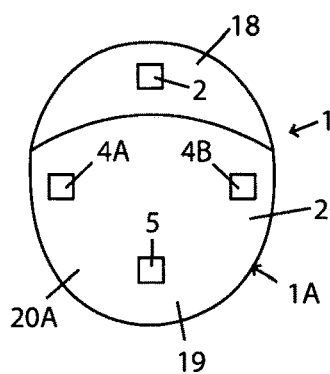
FIG. 1B
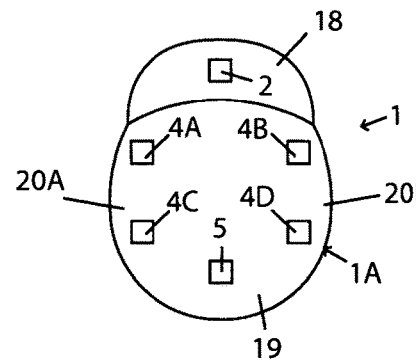
FIG. 1C
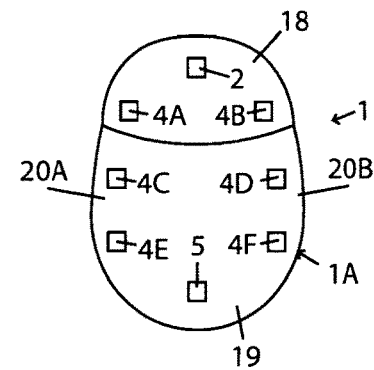
FIG. 1D
FIG. 1

SMART HEADGEAR

CROSS-REFERENCE TO RELATED APPLICATION

This application is a continuation application of U.S. application Ser. No. 13/658,793 which claims a priority to and claims the benefit of U.S. Provisional Application No. 61/628,151, filed on Oct. 24, 2011. U.S. application Ser. No. 13/658,793 is hereby incorporated herein by reference. U.S. Provisional Application No. 61/628,151 is hereby incorporated herein by reference.

U.S. application Ser. No. 13/658,793 claims a priority to and claims the benefit of U.S. Provisional Application No. 61/630,264, filed on Dec. 6, 2011. U.S. Provisional Application No. 61/630,264 is hereby incorporated herein by reference.

TECHNICAL FIELD

Embodiments of the invention relate generally to a smart helmet. Embodiments of the invention can also relate to smart non-helmet (non-protective) headgears such as, by way of example and not by way of limitation, cowboy hats, sun-hats, or other types of headwear.

BACKGROUND

Spectators (e.g., fans or observers) can watch spectator events on televisions, computers, or other imaging devices from the grandstand view or grandstand perspective. A spectator event can be, for example, any event with an audience such as, for example, speeches, concerts, sporting events, or other types of events. A sporting event can be, by way of example and not by way of limitation, any competitive event such as a football game, a horse race, a car race, a golf tournament, or another sporting event.

Fan interests in any spectator event, such as a sporting event, can be increased if the viewing experience of spectators can be enhanced. Currently, most sport fans view a televised sporting event from the grandstand view, which is a limited two-dimensional view or binocular perspective. By enhancing the viewing experience, fans can have a virtual perspective, first-person perspective, and/or participant-perspective that allow them to experience the heart-pounding excitement, intensity, sounds, and/or speed of a competitive sporting event. This enhanced viewing experience allows the fan to virtually experience the competitive action of a sporting event or other event. Therefore, it would be desirable to provide technologies that can enhance the viewing experience of and captivate the fans.

Conventional technology permits cameras to be mounted on participants in some sporting events. For example, car-mounted cameras allow the fans to periodically view a car race from the perspective of the race car driver. However, conventional technology does not provide a virtual presence or enhanced viewing experience for captivating the spectators.

Based on the above discussion, the current technology is limited in its capabilities and suffers from at least the above constraints and deficiencies.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Note a same embodiment of the MVUI may have different reference numerals in the various drawings. Additionally, the left-most digit of a reference number can identify the drawing in which the reference number first appears.

FIG. 1A is a block diagram of a smart helmet in accordance with an embodiment of the invention.

FIG. 1B is a block diagram of a smart helmet in accordance with another embodiment of the invention.

FIG. 1C is a block diagram of a smart helmet in accordance with another embodiment of the invention.

FIG. 1D is a block diagram of a smart helmet in accordance with another embodiment of the invention.

DETAILED DESCRIPTION OF PREFERRED EMBODIMENTS

Figure 2:
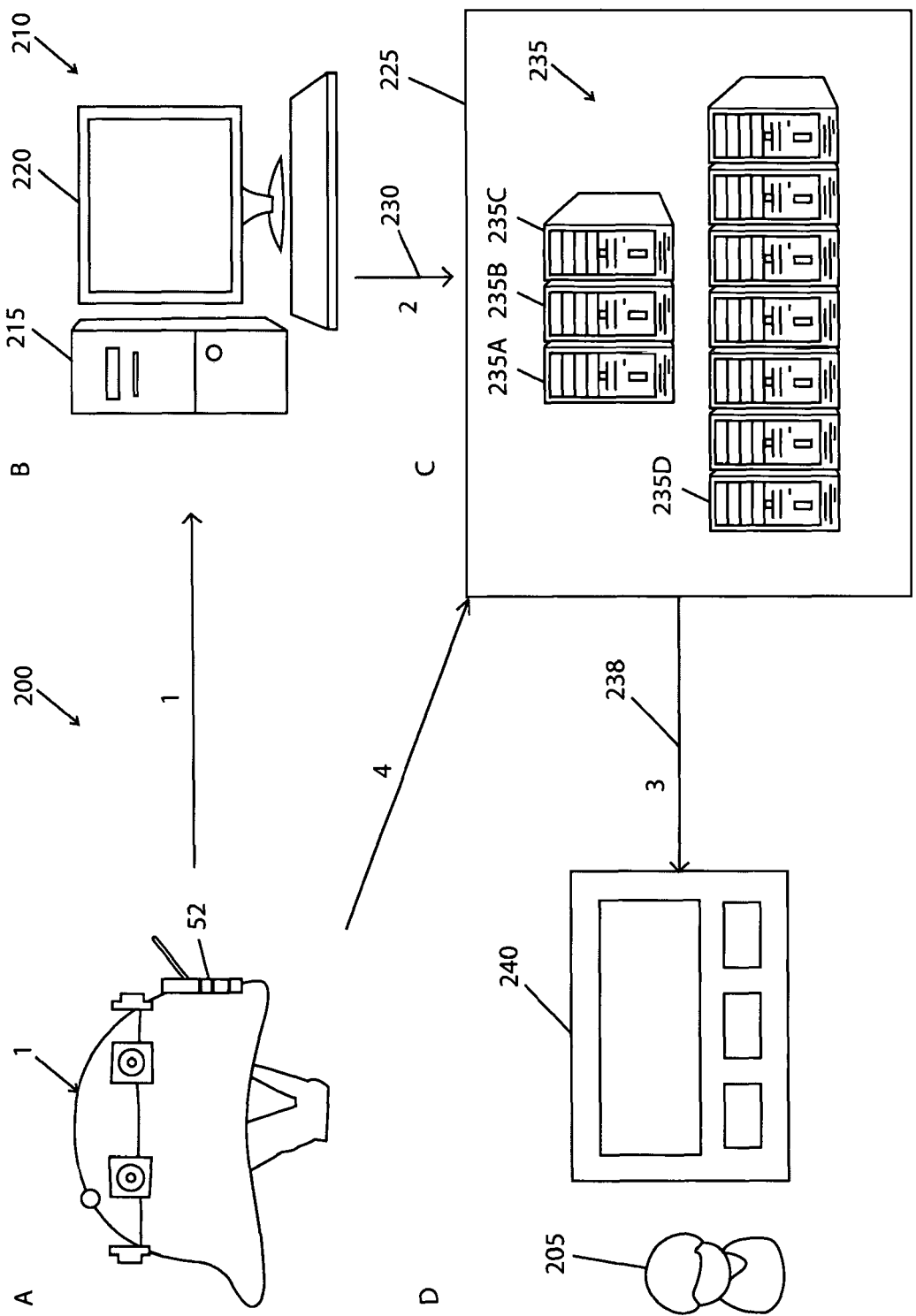
FIG. 2 is a block diagram of a communication system in accordance with an embodiment of the invention.

In the description herein, numerous specific details are provided, such as examples of components, materials, parts, structures, and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, structures, and/or the like. In other instances, well-known components, materials, parts, structures, methods, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Those skilled in the art will understand that when an element or part in the drawings is referred to as being "on" (or "connected" to or "coupled" to or "attached" to) another element, it can be directly on (or attached to) the other element or intervening elements may also be present. Furthermore, relative terms such as "inner", "outer", "upper", "above", "lower", "beneath", and "below", and similar terms, may be used herein to describe a relationship of one element to another element. It is understood that these terms are intended to encompass different orientations of the device in addition to the orientation depicted in the figures.

Although the terms first, second, and the like may be used herein to describe various elements, components, parts, regions, layers, chambers, and/or sections, these elements, components, parts, regions, layers, chambers, and/or sections should not be limited by these terms. These terms are only used to distinguish one element, component, part, region, layer, chamber, or section from another element, component, part, region, layer, chamber, or section. Thus, a first element, component, part, region, layer, chamber, or section discussed below could be termed a second element, component, part, region, layer, chamber, or section without departing from the teachings of the present invention.

Embodiments of the invention are described herein with reference to cross-sectional view illustrations that are schematic illustrations of representative embodiments of the invention. As such, variations from the shapes of the illustrations as a result of, for example, manufacturing techniques and/or tolerances are expected. Embodiments of the invention should not be construed as limited to the particular shapes of the regions or components/parts/elements illustrated herein but are to include deviations in shapes that result, for example, from manufacturing or particular implementations. For example, an element illustrated or described as square or rectangular may typically have rounded or curved features due to normal manufacturing tolerances or due to a particular implementation. Thus, the elements illustrated in the figures are schematic in nature and their shapes are not intended to illustrate the precise shape of an element of a device and are not intended to limit the scope of the invention.

Embodiments of the invention advantageously provide a cutting-edge experience and virtual experience for viewers of spectator events. A spectator event can be any event with an audience such as, by way of example and not by way of limitation, speeches, concerts, sporting events, or other types of events. A sporting event can be, by way of example and not by way of limitation, any competitive event such as a football game, a horse race, a car race, a golf tournament, or another sporting event. Embodiments of the invention can advantageously promote fan interests in any spectator event, such as a sporting event, by enhancing the viewing experience of the spectators.

In particular, embodiments of the invention advantageously provide an important paradigm shift from the conventional binocular perspective (or conventional limited two-dimensional perspective) to a virtual perspective, first-person perspective, and/or participant perspective of a spectator event for a viewer. For example, an embodiment of the invention can be included in a jockey helmet and puts the viewer in the middle of a horse race. As a result, the viewer can experience the race from a jockey's perspective and "can get some turf or dirt in his or her face" during the race. In other embodiments of the invention, the viewer can additionally hear the audio sounds of the game or event. For example, an embodiment of the invention additionally allows the viewer to hear the voices of jockeys and sounds of horses during a horse race, or words of participants in other spectator events. As one specific example of a sporting event, horse racing has been unsuccessful in captivating audiences, especially when compared to other mainstream sports. Conventional technology only allows the fan to have a two-dimensional experience, reminiscent of the binocular era that fails to use technology to improve the connection of the fan to sport. In contrast, embodiments of the invention allow the viewers to "Ride the Race" from the point of view of the jockey, and to be able to feel the speed, beauty, and intensity that is the "Sport of Kings". Therefore, embodiments of the invention provide, for example, the fans a real-time "Virtual Presence", meaning the fan can be sitting in his/her couch at home with a computer, mobile telephone with a viewing screen, or other imaging device and can be simultaneously riding along in the Kentucky Derby.

Since embodiments of the invention can significantly enhance the viewing experience, fans will be able to feel the heart-pounding excitement, intensity, sounds, and/or speed of a competitive sporting event. This enhanced viewing experience allows the fan to virtually experience the competitive action of a sporting event or other event, and captivates viewers, leading to increased interests beneficial to sports or other events.

FIG. 1A is a block diagram of a smart helmet 1 in accordance with an embodiment of the invention. The smart helmet 1 is, by way of example and not by way of limitation, a smart jockey helmet. While the drawings herein disclose various embodiments of the invention as included in an exemplary smart helmet, it is understood that embodiments of the invention can also be included in a smart non-helmet which are non-protective headgears such as, for example, cowboy hats, sun-hats, or other types of headwear. In an embodiment of the invention, the smart helmet 1 includes the following elements to be discussed below in additional details: a helmet body 1A; a front facing camera 2; a microphone 3; one or more side facing cameras 4; a rear facing camera 5; a communications subsystem 6 which may include a visible, external aerial or include an aerial that is disposed inside of (or integrated with) the helmet body 1A and is thus out of sight; a control subsystem 7 containing a mobile computer function for digital system or an analog (analogue) signal processing unit for analog signals; a position tracking subsystem 8 for containing a global positioning system (GPS) receiver for tracking the current position of the smart helmet 1; and a telemetry subsystem 9 which, for example, can generate data on the velocity of the helmet 1, data on the angle of the helmet 1 compared to the plane of the land, total time for every fractional distance (e.g., total time for every two furlongs traveled by the helmet 1), and/or other data. The helmet 1 can include optional strap(s) 11 for securing the helmet 1 on the head of the wearer.

In various embodiments of the invention, at least one or more of the above-discussed components in the helmet 1 can be optionally omitted. However, each embodiment of the invention will include the smart helmet body 1A, the communications subsystem 6, the control subsystem 7, and at least one camera such as, for example, any type of camera as discussed herein.

The cameras 2, 4, and 5, microphone 3, subsystem 6, subsystem 7, subsystem 8, and/or telemetry subsystem 9 can be securely connected to (or removably connected to) the helmet body 1A by use of snap-on connectors, welding, and/or other suitable connectors known to those skilled in the relevant art(s). Two components that are removably connected means that the two components can be connected together and can be separated from each other.

In an embodiment, the smart helmet 1 is a protective helmet that can be work to provide head safety. By way of example and not by way of limitation, the smart helmet 1 is a jockey helmet or other sport headgear. However, as mentioned above, in another embodiment of the invention the smart helmet 1 is a smart non-helmet which is a non-protective headgear such as, by way of example and not by way of limitation, cowboy hats, sun-hats, or other types of headwear.

In an embodiment of the invention, the number of cameras on the helmet 1 can vary. By way of example and not by way of limitation, the helmet 1 can include only a single camera such as the front facing camera 2 which captures a single wearer point of view, presumably from a forward looking vantage point. When the helmet 1 uses and includes more than one camera, especially four or more cameras, for example, then the helmet 1 can generate a 360 degree immersive-style video for viewing by the user and for providing the viewer an on-field or virtual experience perspective of the spectator event.

Figure 15:
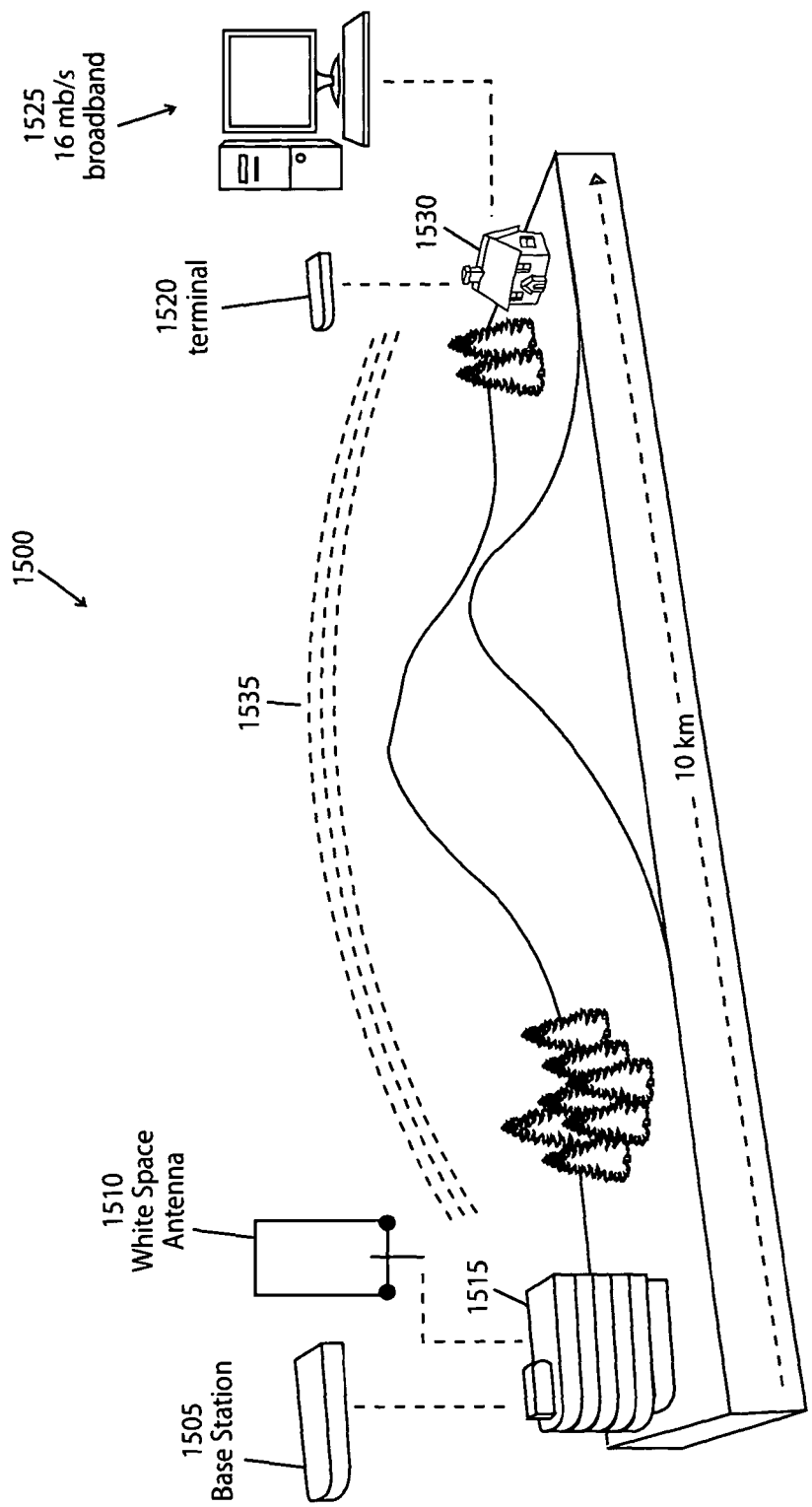
FIG. 15 is a block diagram of an exemplary wireless system that can be used to transmit wireless signals in an embodiment of the invention.

By way of example and not by way of limitation as shown in FIG. 15, if the helmet 1 includes four cameras, then the cameras will be placed on the helmet 1 at approximately 90 degrees apart. In this example, the helmet 1 would include a camera providing the wearer POV (such as the front facing camera 2) on the front portion 18 of the helmet body 1A, a rear facing camera 5 on the rear portion 19 of the helmet body 1A, a first side facing camera 4A approximately 90 degrees from the front facing camera 2 or rear facing camera 5 and at the first side 20A of the helmet body 1A, and a second side facing camera 4B opposite to the first side facing camera 421, where the camera 4B is at approximately 90 degrees from the front facing camera 5 or rear facing camera 5 and on the second side 20B of the helmet body 1A.

By way of example and not by way of limitation as shown in FIG. 1C, if the helmet 1 includes six cameras, then the cameras will be placed on the helmet 1 at approximately 60 degrees apart. In this example, the helmet 1 would include a camera providing the wearer POV (such as the front facing camera 1), a rear facing camera 5, a first side facing camera 4A approximately 60 degrees from the front facing camera 2 and at the first side 20A, a second side facing camera 48 opposite to the first side facing camera 4A where the camera 4B is at approximately 60 degrees from the front facing camera 2 and on the second side 20B, a third side facing camera 4C on the first side 20A and approximately 60 degrees from the first side facing camera 4A, and a fourth side facing camera 40 on the second side 20B and approximately 60 degrees from the second side facing camera 4B.

Figure 10:
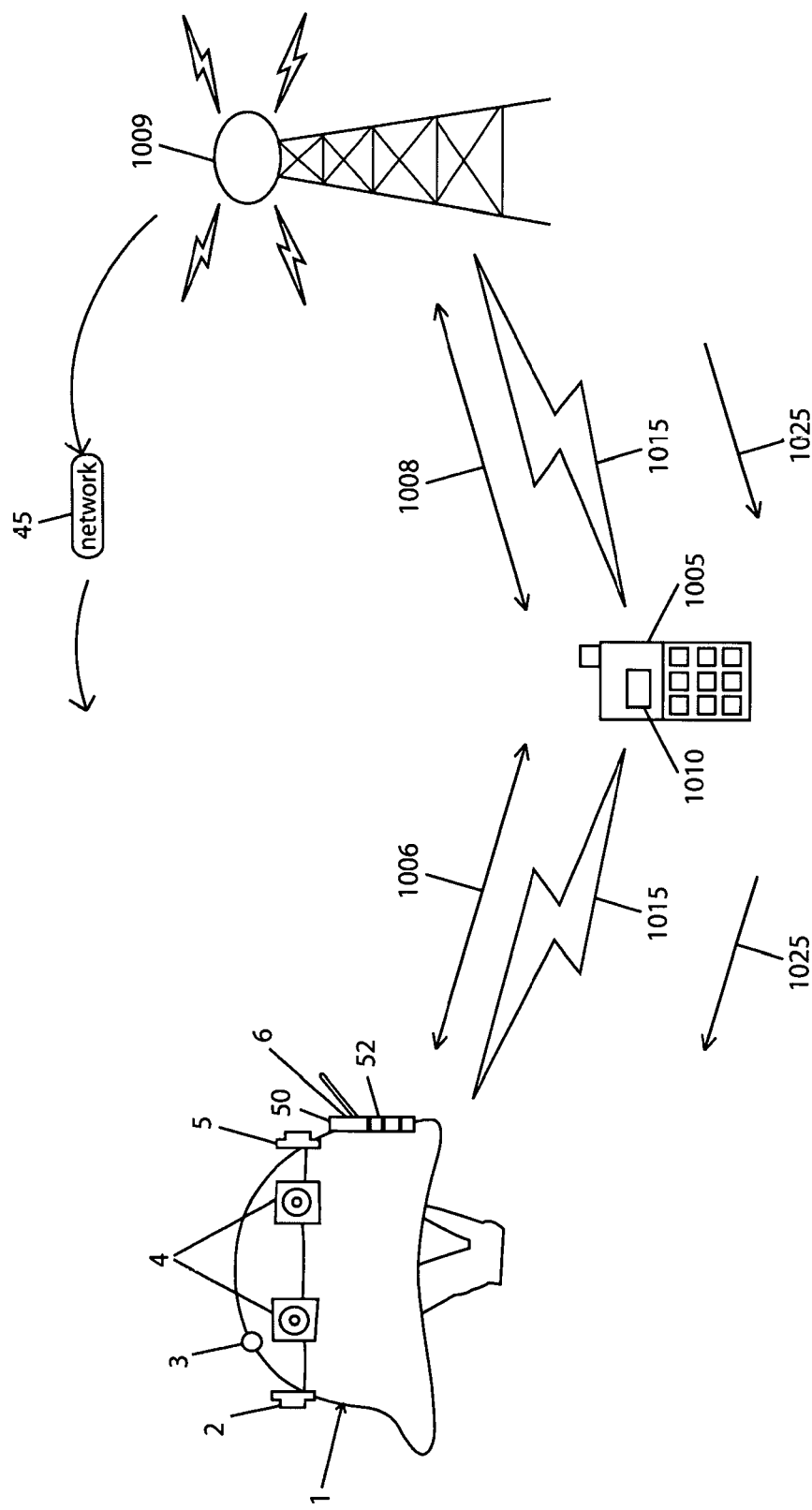
FIG. 10 is a block diagram of a smart helmet in accordance with another embodiment of the invention.

By way of example and not by way of limitation as shown in FIG. 10, if the helmet 1 includes eight cameras, then the cameras will be placed on the helmet 1 at approximately forty-five (45) degrees apart. In this example, the helmet 1 would include a camera providing the wearer POV (such as the front facing camera 2), a rear facing camera 5, a first side facing camera 4A approximately 45 degrees from the front facing camera 2 and at the first side 20A, a second side facing camera 4B opposite to the first side facing camera 4A, where the camera 4B is at approximately 45 degrees from the front facing camera 2 and on the second side 20B, a third side facing camera 4C on the first side 20A and approximately 45 degrees from the first side facing camera 4A, a fourth side facing camera 40 on the second side 20B and approximately 45 degrees from the second side facing camera 4B, a fifth side facing camera 4E on the first side 20A and approximately 45 degrees from the third side facing camera 4C, and a sixth side facing camera 4F on the second side 20B and approximately 45 degrees from the fourth side facing camera 4D.

In other embodiments of the invention, more than 8 cameras can be included with the smart helmet 1 and these cameras would be spaced apart at a closer distance than the distance between the cameras included with the smart helmet 1 of FIG. 1C or FIG. 1D.

In an embodiment of the invention, at least one of the cameras 2, 4, and/or 5 is a camera that can capture 3-dimensional (3D) images. For a 3D camera, the camera lenses could be, for example, stereo lenses to capture 3D Images.

In an embodiment of the invention, any of the cameras 2, 4, and 5 can be removably mounted via connectors to the helmet body 1A or can be welded on the helmet body 1A. In another embodiment of the invention, any of the cameras 2, 4, and 5 can be embedded in the helmet body 1A. By way of example and not by way of limitation, a camera embedded in the helmet body 1A would typically be a light-weight, small-sized camera such as those cameras used (or those similar to cameras used), for example, in medical endoscopy imaging or other imaging technologies.

In an embodiment of the invention, the cameras included with the smart helmets disclosed herein can record high definition images such as, by way of example and not by way of limitation, approximately 1080p resolution. In other embodiments of the invention, the cameras can record alternative lower quality formats such as, by way of example and not by way of limitation, approximately 720p, 480p, or other resolution values, in order to achieve cost saving and/or bandwidth saving requirements as required by a user.

The microphone 3 to record the audio of the surroundings of the smart helmet 1 can also be optionally used to accompany the cameras that capture images and/or record video. However, in other embodiments of the invention, the microphone 3 can be omitted for purposes of achieving lower costs or less complex processing circuitries for the subsystem 6 and/or subsystem 7. In an embodiment of the invention, the microphone 3 can be attached to any suitable position on or inside of the helmet body 1A. In FIG. 1A, the microphone 3 is shown as attached at the front 18 and towards the top 30 of the helmet 1. However, in other embodiments of the invention, the microphone 3 could equally be placed lower or higher on the helmet 1, on the brim 32 of the helmet 1, or even close to the jockey's mouth to capture his/her utterances more clearly. For example, a microphone extension 34 can be optionally attached to the helmet 1 and microphone 3A, and this extension 34 can generally extend in the direction of the mouth of the wearer so that the microphone 3 can more clearly capture the utterances and/or voices more clearly.

In another embodiment of the invention, the smart helmet 1 is not limited to a single microphone 3 and instead can include a plurality of microphones. These multiple microphones can be used, by way of example and not by way of limitation, to capture stereo tracks and/or more audio tracks. By way of example and not by way of limitation, the helmet 1 includes multiple microphones formed by the microphone 3 on the helmet body 1A and the microphone 3A attached to the extension 34.

In an embodiment of the invention, the communication subsystem 6 is the component of the smart helmet 1 that connects the helmet 1 to the rest of the world for communication functions. The communications subsystem 6 provides the smart helmet 1 with a digital or analog connection to a local base station 42 setup to receive the smart helmet signals 43. If the communications subsystem 6 has digital transmission capability, then the subsystem 6 can be communicatively linked directly via communications network 45 that will transmit the smart helmet signals 43 from the subsystem 6 to a destination node 46 that is communicatively coupled to the network 45. The network 45 could be, by way of example and not by way of limitation, the Internet or another wide-area communications network, a local communications network, a private communications network, and/or another communications network. For digital communications connections, using WiFi/WLAN or a WAN, the communications 43 from the smart helmet 1 will involve Internet Protocol (IP) packets, but the communications subsystem 6 will indeed be an IP addressable node.

Additionally or alternatively, communications subsystem 6 of the smart helmet 43 can transmit the communications 43 via one or more telecommunications networks 47 which can be, for example, a mobile/cellular phone network, a GSM network, a CDMA network, a radio network, and/or the like. Such additional networks or optional networks 47 would allow the smart helmet 1 to send the communications 43 to a mobile or cellular telephone 48 being used by a user. Such networks 47 could also facilitate the smart helmet 1 in sending the communications 43 via the network 45 (e.g., Internet) to the mobile or cellular telephone 48.

For an analog communications connection, the video, audio, and/or other signals will be transmitted from the subsystem 6 to the destination station 42 by use of available analog transmission frequencies. For example, these analog communication signals can be RF signals of a given frequency such as, e.g., approximately 2.4 GHz or 5.8 GHz.

In an embodiment of the invention, the communications subsystem 6 may include a visible, external aerial or have an aerial that is integrated inside a device itself that also contains the control subsystem 7, or have an aerial that is integrated with the helmet body 1A, or have an aerial that is disposed within the interior surface of the helmet body 1A. As defined herein, an aerial forms the external packaging (or box) containing the circuits in the subsystem 6.

In an embodiment of the invention, the helmet 1 includes a smart system 52 having the communications subsystem 6 and the control subsystem 7. In another embodiment of the invention, the smart system 52 includes the communications subsystem 6, control subsystem 7, and at least one of the position tracking subsystem 8 and/or telemetry subsystem 9. Other variations in the smart system 52 are possible in other embodiments of the invention.

In one embodiment, the smart system 52 includes an antenna 53 for use in transmitting signals from the smart system 52. However, in another embodiment of the invention, the antenna 53 is not necessarily visible to the observer and may be integrated with, built into, and/or plush with the packaging 50 or with the helmet 1.

In an embodiment of the invention, any of the communications subsystem 6, control subsystem 7, position tracking subsystem 8, and/or telemetry subsystem 9 are contained within a packaging 50 which can vary in shape, configuration, and/or placement with respect to the smart helmet body 1A. By way of example and not by way of limitation, the packaging 50 can have a box shape (or rectangle shape) as shown in FIG. 1A. However, the packaging 50 can also have other shapes and/or configurations. For example, the packaging 50 can have a more flush shape with respect to the helmet body 1A, as will be discussed below.

By way of example and not by way of limitation, the packaging can be coupled to the rear portion 19 of the smart helmet body 1A as shown in FIG. 1A. However, the packaging 50 can also be coupled to other portions of the smart helmet body 1A such as, by way of example and not by way of limitation, the front portion 18, the top portion 30, the left side portion 20A (FIG. 1B), the right side portion 20B, and/or other portions of the smart helmet body 1A.

In an embodiment of the invention, the control subsystem 7 includes the components for mobile computer functions for digital systems or the analog signal processing unit for analog signals. The control subsystem 7 collects and processes the video, audio, GPS, and/or telemetry data, and the communications subsystem 6 sends these data from the smart helmet 1 to a destination such as, by way of example and not by way of limitation, the local base station 42 or the node 46. By way of example and not by way of limitation, the control subsystem 7 can format the video, audio, GPS, and/or telemetry data into digital data streams or data packets which the communications subsystem 6 can then stream as digital signals via network 45 to the node 46. By way of example and not by way of limitation, the control subsystem 7 can modulate the video, audio, GPS, and/or telemetry data with a carrier wave of a given frequency and the communications subsystem 6 can transmit the modulated signal to the local base station 42.

In an embodiment of the invention, if the control subsystem 7 includes (or is embodied as) a digital control subsystem, then the digital control subsystem will receive the digital signals from each of the attached devices (e.g., camera 2, microphone 3, cameras 4, camera 5, position tracking subsystem 8, and/or telemetry subsystem 9) and may subsequently alter or multiplex the digital signals before transmission. By way of example and not by way of limitation, examples of such alterations of digital signals includes (1) stitching the various camera-captured video data together to provide a single video stream that emulates a 360 degree video and/or (2) transcoding the video data from the format provided by the cameras to a network transmittable encoding format.

Methods for stitching of multiple camera video signals, as known to those skilled in the relevant art(s), may be used on the digital signals before transmissions of the digital signals by the communications subsystem 6.

By way of example and not by way of limitation, a network transmittable encoding format technique can be MJPEG or YUV raw video transcoded to MPEG4 video packaged in an MPEG-TS stream. Video encoding and transcoding hardware may be included as part of the control subsystem 7.

By way of example and not by way of limitation, multiplexing of signals include sending the video data and telemetry data across the network to the same destination network devices or using the same protocol to send the signals. Multiplexing of the video and audio signals involves the control subsystem 7 combining together these signals into a single media stream. The communications subsystem 6 then transmits this media stream to a destination such as, e.g., the local base station 42 or/and node 46 or/and remote device 48.

In an embodiment of the invention, for a control subsystem V that includes (or embodied as) an analog control subsystem, video and audio data may be transmitted directly from the cameras and microphones by the communication subsystem 6 or routed through the control subsystem 7 that converts the analog data (by use of alteration or multiplexing) before transmission.

In an embodiment of the invention, a digital control subsystem can also be used with both digital and analog video and audio devices, depending on the inputs and configuration of a controller 1202 (FIG. 12) in the subsystem 7.

In an embodiment of the invention, the helmet 1 can optionally include a position tracking system 8 which can be, by way of example and not by way of limitation, a GPS receiver for tracking the current position of the smart helmet 1 (i.e., current position data of the smart helmet 1). The GPS signals are received from the GPS tracking system 8 and sent to the control subsystem 7 which, in turn, determines the method for transmitting the GPS signal from the smart helmet 1.

As known to those skilled in the relevant art(s), a GPS receiver is typically a single, small chip (IC) when used in embedded applications. The chip is typically mounted on a board. When the chip is powered by voltage and receives satellite signals, the chip emits a stream of NMEA (usually) encoded position data. In an aspect, the control subsystem 7 is configured to process that position data in various methods. By way of example and not by way of limitation, the control subsystem 7 transmits that position data as part of the data stream. Examples of the chips that can be used in the GPS tracking system 8 include the following products: http://www.micro-modular.com/gps.php?part=MN8010& go=brief or http://www.amazon.co.uk/Channel-Micro-miniature-MN5010HS-GPS-Receiver/dp/B004UC3D76. In an aspect, the connection to the control subsystem 7 is, for example, via a serial connection at a (typically) low baud rate.

In an embodiment of the invention, the helmet 1 can optionally include a telemetry subsystem 9 which is a component for taking additional measurements from the smart helmet 1. In an embodiment, the telemetry subsystem 9 will capture telemetric data that includes velocity information of the smart helmet 1. In another embodiment, the telemetry subsystem 9 is configured with a signal generating system for tracking at least one or some of the following telemetry data: the smart helmet's velocity, acceleration, angles at which the helmet is pitched, total time travelled between fractional distances (e.g., every two furlongs), and/or other information.

In an embodiment, a number of separate chips (ICs) or/and devices together will collect different telemetric data and the control subsystem 7 polls these devices for the various telemetric data. In another embodiment, the telemetry subsystem 9 includes only a single chip for tracking a particular telemetric data such as, by way of example and not by way of limitation, the velocity of the smart helmet 1. In another embodiment, the telemetry subsystem 9 includes a plurality of chips, where each chip will track a respective telemetric data (e.g., a first chip will track the velocity of the smart helmet 1, while a second chip will track the angles at which the smart helmet 1 is pitched). Other variations in the telemetry subsystem 9 are possible in an embodiment of the invention. An example device that can be used to track the telemetric data is a triple axle accelerometer disclosed in http://www.sparkfun.com/products/9269. This accelerometer is a dumb device that outputs acceleration as a change in voltage across a connecting pin and is thus wired directly into the telemetry subsystem 9.

In an embodiment of the invention, at least some of the elements or features shown in one or more of the drawings identified herein (or shown in two or more different drawings identified herein) may be included as features of a particular smart helmet. Therefore, even if at least two different features are shown in at least two different corresponding drawings, these at least two different features can be included in the same smart helmet in accordance with an embodiment of the invention.

Those skilled in the relevant art(s) would realize based on the discussion of the embodiments herein that various signal coupling technologies such as, by way of example and not by way of limitation, circuits, links, cables, wiring, electrical traces, wireless links or wireless methods, optical links, other signal coupling technologies, and/or combinations of various signal coupling technologies can be used to couple the signals of one or more elements such as, e.g., camera 2, microphone 3, at least one camera 4, camera 5, subsystem 6, subsystem 7, subsystem 8, and/or subsystem 9. By way of example and not by way of limitation, a link 14 is shown as coupling the signals of some of the elements of the smart helmet 1. However, the link 14 can couple some of the signals of (or otherwise communicatively couple) at least some elements of the smart helmet 1 in another type of configuration.

FIG. 2 is a block diagram of a communication system 200 in accordance with an embodiment of the invention. An embodiment of the communication system 200 is one example of a system that can operate with a smart helmet 1 as discussed above. However, based on the discussion herein, those skilled in the relevant art(s) will realize that an embodiment of the smart helmet 1 can be used with other types of communications systems.

In FIG. 2, the communications connections between the smart helmet 1 and an end user 205 are shown. The end user 205 can be any individual who wants to experience the virtual presence viewpoint provided by various embodiments of the invention. An embodiment of the smart helmet 1 connects to a local base station (B) 210 and transmits its captured video streams, audio streams, and/or other data streams to the base station 210. As discussed above, these other data streams can include, for example, current position data (i.e., GPS data) and/or telemetric data.

In an embodiment of the invention, the base station 210 can monitor the incoming streams from the smart helmet 1. By way of example and not by way of limitation, the base station 210 includes a server 215 for receiving and storing the incoming streams and a computer 220 for configuring the server 215 and obtaining data from the server 215. In another embodiment of the invention, the base station 210 can monitor incoming streams from multiple smart helmets 1 by use of multiple servers 215 for each smart helmet 1 or by use of multiple processes in a single server 215 where each process can be assigned to receive and process the data streams from a corresponding given smart helmet 1. An embodiment of the invention where multiple helmets provide data to a particular destination device will be discussed in additional details below.

In an embodiment of the invention, the base station 210 may alter or enhance the received incoming stream as desired. By way of example and not by way of limitation, the base station 210 can transcode its received incoming stream and/or be configured to receive additional location-dependent data (e.g., racetrack provided data such as morning line information, current odds, jockey changes, horse scratches, and/or other information), and to then send the data to a server fabric (C) 225 via a communications network 230 (e.g., the Internet). The data sent to server fabric 225 can be the originally received incoming stream from the helmet 1 or can be an altered or enhanced stream that includes the additional location-dependent data and/or other additional data.

In an embodiment of the invention, the server fabric 225 is formed by distributed servers 235 which are a plurality of servers that are communicatively coupled together. The servers 235 will save the incoming media streams and data streams (from the base station 210) and perform other transcoding or alteration as needed to provide a useful virtual presence facility for end users 205. It is within the scope of embodiments of the invention to use any suitable communication protocols for transmitting data between the distributed servers 235.

In an embodiment of the invention, the servers 235 will transmit the media streams (e.g. video and/or audio data) and other data streams (e.g., helmet tracking data and/or telemetric data) via network 238 to a viewer application 240 of an end user 205. The network 238 can be, by way of example and not by way of limitation, a wireless cellular phone network and/or a communications network such as, e.g., the Internet or other communications networks. By way of example and not by way of limitation, this viewer application 240 can be a streaming video viewer in a portable device such as, e.g., a cellular phone of an end user 205. By way of another example and not by way of limitation, the viewer application of an end user 205 can be on a desktop computer, a portable computer, or computer notebook, or another computing device, as long as the computing device can access a communications network such as, e.g., the Internet and subsequently access the server fabric 225.

Those skilled in the relevant art(s), upon review of the various embodiments herein, will realize that the viewer application 240 may vary depending on the destination device used by the user 205. By way of example and not by way of limitation, for users on the Internet, the viewer application 240 can function as a Flash based viewer application, and thus the server fabric 225 (or base station 210) can transcode the audio and video signals (and/or other data signals) from the smart helmet(s) 1 into a Flash video FLV container, and the server fabric 225 can then send the transcoded signal via network 238 to a viewer application 240 using RTMP. By way of example and not by way of limitation, for users of destination devices and/or software such as iOS, iPhone, iPad and/or other portable and/or WAN-based (e.g., Internet-based) technology, the server fabric 225 (or base station 210) can transcode the signals from the smart helmet(s) 1 to HTTP Live Streaming. By way of example and not by way of limitation, for users of destination devices such as general cellular phones, the server fabric 225 (or base station 210) can transcode the signals from the smart helmet(s) to 3GP. Various elements in the system 200 can perform the above transcoding functions and/or other transcoding options if other destination devices require these transcoding options or features in the future.

In an embodiment of the invention, the viewer application 240 components allows the end users 205 to experience the 360 degree video and virtual presence in the environment of the smart helmet 1. In another embodiment of the invention, the end user 205 can shift his/her view as seen from a POV of a first smart helmet to a POV of a second smart helmet or POVs of other smart helmets. The end user 205 can control the viewer application 240 to selectively receive media streams or other data streams from one server 235a (that transmits streams from a first smart helmet). The end user 205 can control the viewer application 240 to selectively receive media streams from other servers, such as, for example, the server 235b (that transmits streams from a second smart helmet), the server 235c (that transmits streams from a third smart helmet), the server 235d (that transmits streams from a fourth smart helmet), and so on.

In another embodiment of the invention, the control and communications of the subsystems 6 and 7 may allow a direct connection to the Internet rather than requiring the subsystem 7 to connect to the base station 42 for signal transmission from the smart helmet 1. In such embodiments, the smart helmet 1 can directly communicate with and transmit streams to the servers 235 via the communications network 230 which can be, for example, the Internet.

In an embodiment of the invention, the server fabric 235 is a collection of servers that perform the functionalities discussed above. The server fabric 235 can be considered a cloud system that can scale individual services depending on demand and system load. In an embodiment of the invention, the server fabric 235 can perform at least some of the following services: capture services which involve receiving media streams and data streams, transcode services which involve converting media streams into a format that is compatible for storage and streaming, and transmit services which involve storage of streams and dissemination of the content of the streams to end users 205, catalog services which involve storing event related content in one or more catalogs or categories, routing services for routing the content between the servers 235 and dynamic reconfiguration of services on the servers based on network load, storage of media streams and data streams for future use such as later playback, video-on-demand services, selections between sensors that are supplying the media streams, video-on-demand of recorded events, selection of specific streams for a selected spectator event (e.g., jockey status updates, horse position information, latest wagering odds, or other updates), virtual presence services allowing a user to detect other friends present in a spectator event, text communications services between attendees, audio communications services between attendees, and/or video communications services between attendees.

Figure 3:
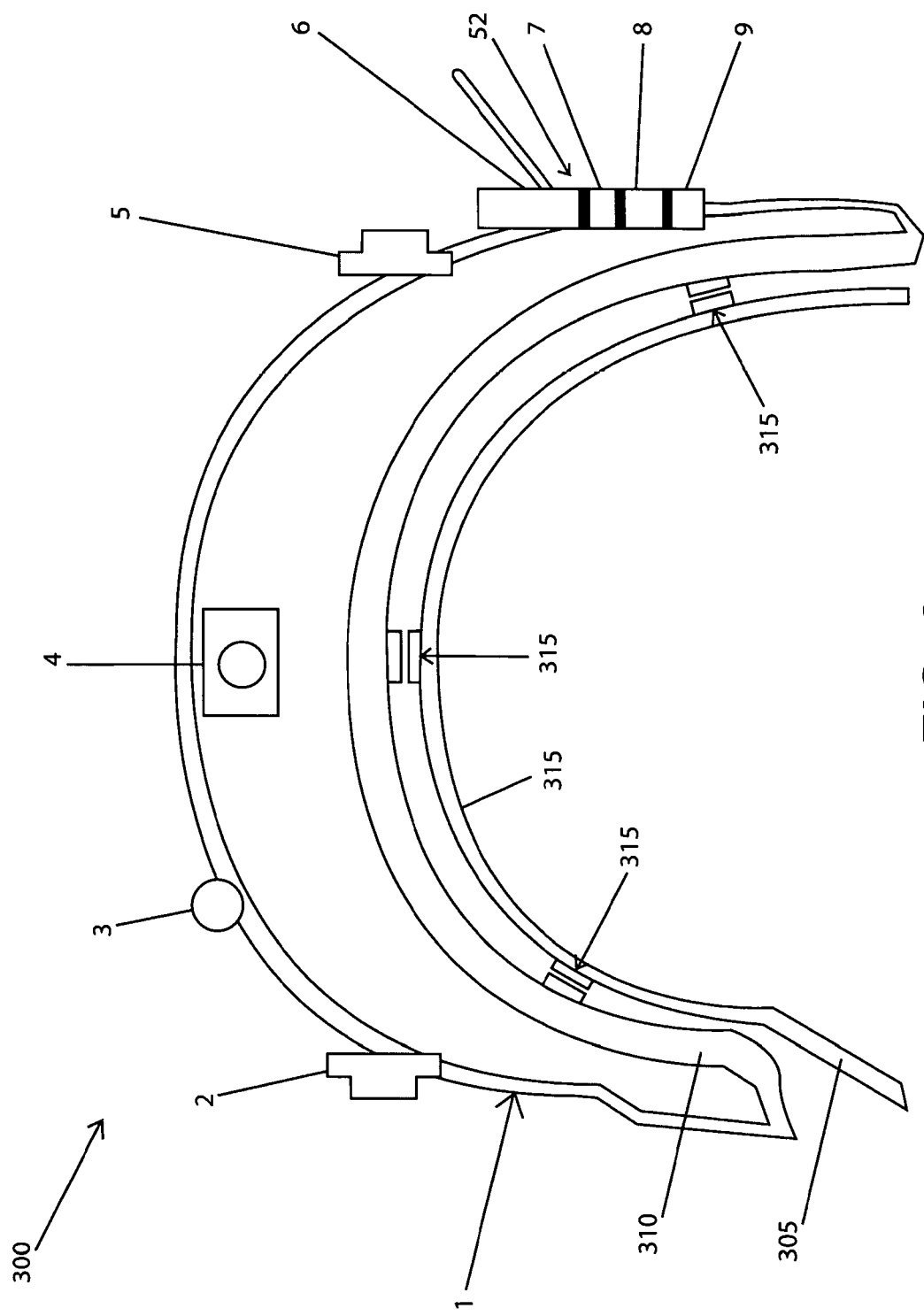
FIG. 3 is a block diagram of a smart helmet in accordance with another embodiment of the invention.

FIG. 3 is a block diagram of a smart helmet 300 in accordance with another embodiment of the invention. The smart helmet 300 includes a head-mount portion 305 for mounting on the head of the wearer and also includes a shell 310 that is removably connected to the head-mount portion 305. One or more connectors 315 are used to removably connect the shell 310 to the head-mount portion 310. By way of example and not by way of limitation, the connectors 315 can be a pair of removably connectable snap-on components or buttons or other suitable connectors. The cameras 2, 4, and 5, microphone 3, subsystem 6, subsystem 7, subsystem 8, and subsystem 9 are mounted on the shell 310. Therefore, the components on the shell 310 are separated from the inner padding 315 that rests on the wearer's head. The first shell 310 advantageously allows, for example, to be quickly removed from the head-mount portion 305 and to be replaced with another hard shell (having at least one of the similar camera or cameras, or/and microphone, and/or subsystems) in the event that a camera or another component in the first shell 310 becomes defective or not operable. This swapping of a defective shell for a replacement shell can be performed quickly on-site such as, by way of example and not by way of limitation, a racetrack or another event venue.

In an embodiment of the invention, at least some of the elements or features shown in one or more of the drawings identified herein (or shown in two or more different drawings identified herein) may be included as features of the shell 310. For example, in one embodiment, at least some or all of the camera 2, microphone 3, at least one camera 4, rear camera 5, subsystem 6, subsystem 7, subsystem 8, and/or subsystem 9 are included in the shell 310.

In another embodiment, at least one of the camera 2, microphone 3, at least one camera 4, rear camera 5, subsystem 6, subsystem 7, subsystem 8, and/or subsystem 9 is included in the shell 310, while at least one of the camera 2, microphone 3, at least one camera 4, rear camera 5, subsystem 6, subsystem 7, subsystem 8, and/or subsystem 9 is included in the head-mount portion 305 if that particular element is not included in the shell 310. In this embodiment, the connectors 315 are configured to permit electrical coupling and/or signal coupling (and/or communicative coupling) of the elements included in the shell 310 and elements included in the head-mount portion 305.

Figure 4:
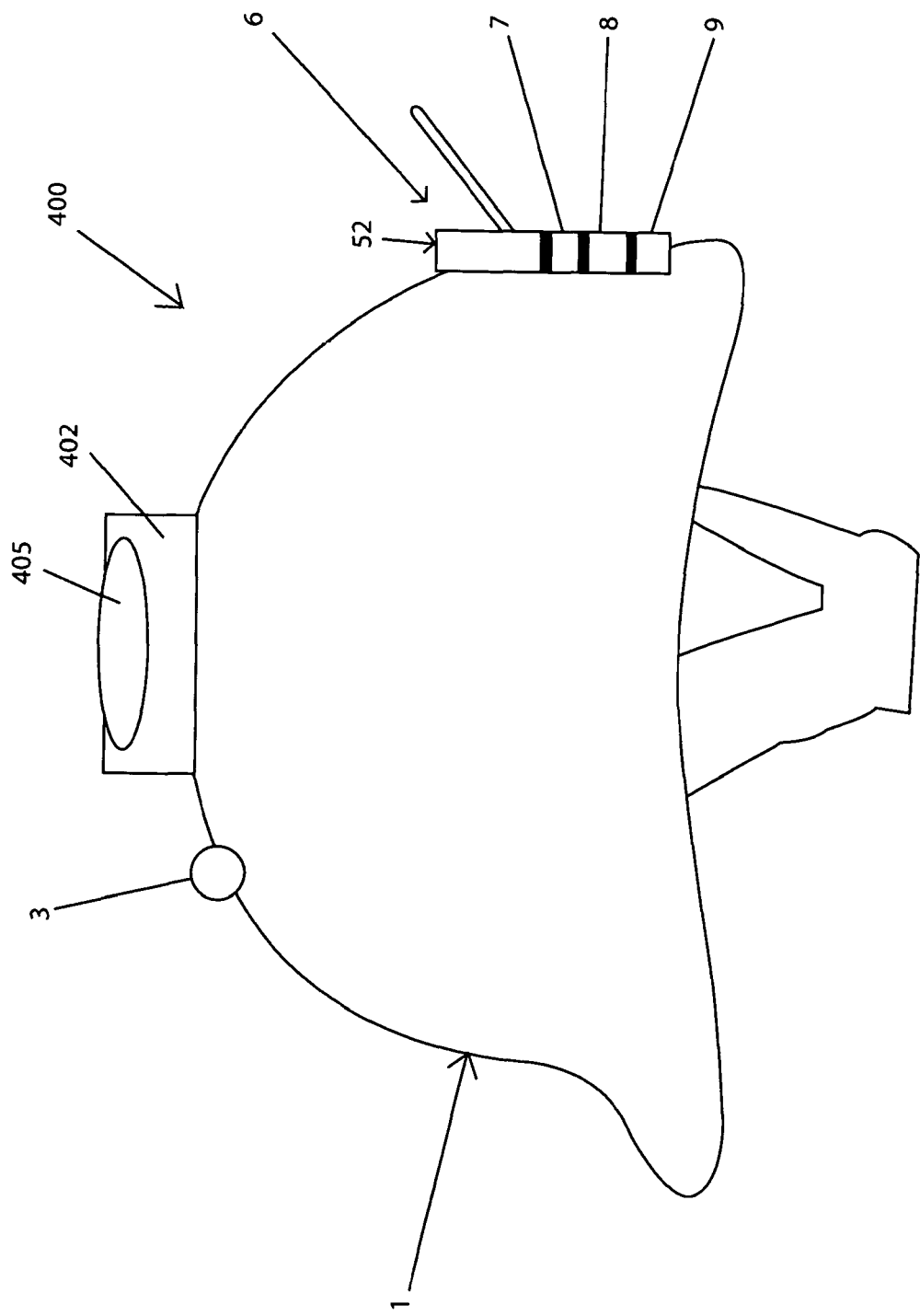
FIG. 4 is a block diagram of a smart helmet in accordance with another embodiment of the invention.

FIG. 4 is a block diagram of a smart helmet 400 in accordance with another embodiment of the invention. The helmet 400 includes a single camera 402 with a panoramic lens 405. By way of example and not by way of limitation, the panoramic lens 405 provides a 360 degree view of the environment without the requirement for stitching of multiple lens-captured images. By way of example and not by way of limitation, a panoramic lens 405 is available from various commercial vendors such as the 360Lens from EGG Solution Limited.

Figure 5:
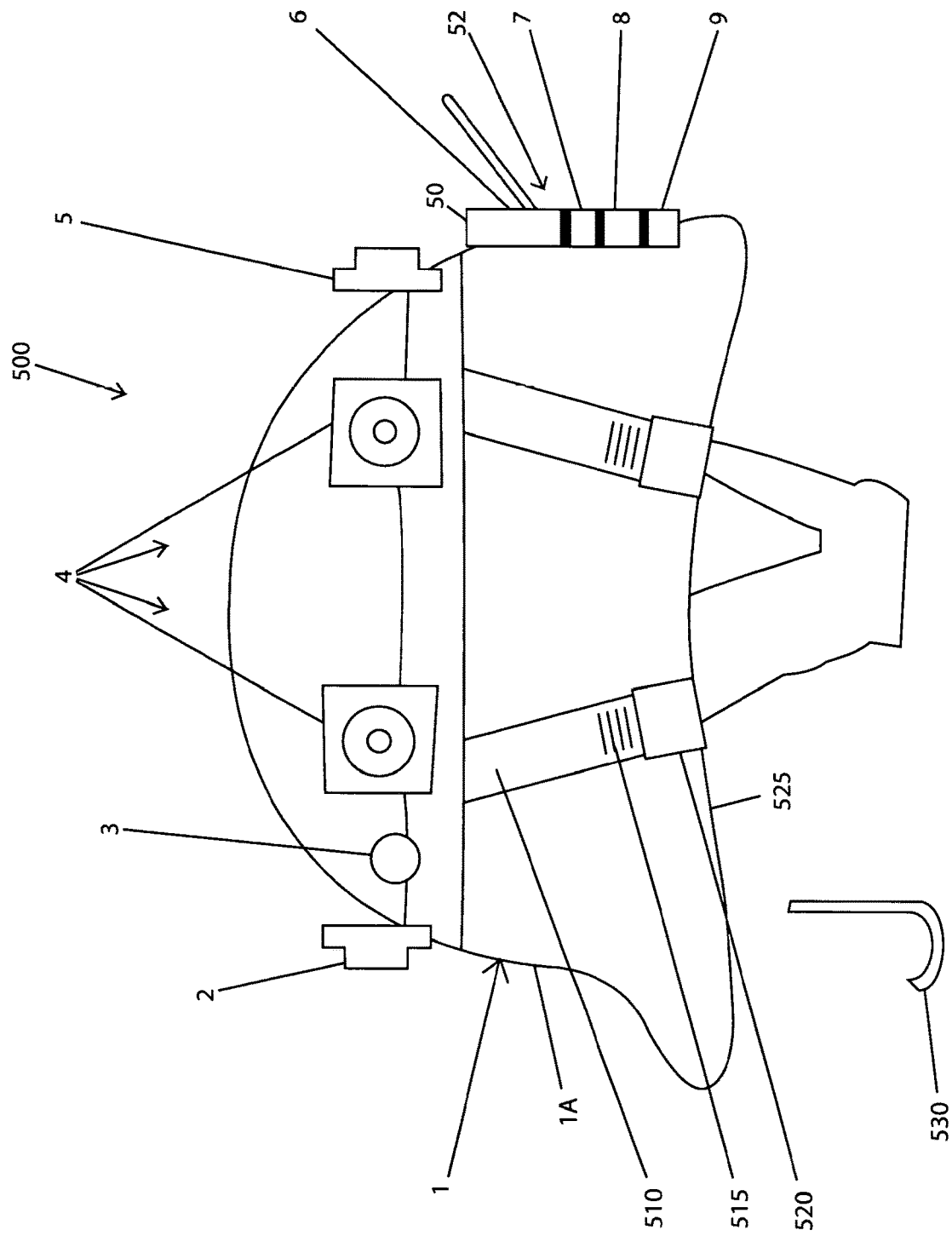
FIG. 5 is a block diagram of a smart helmet in accordance with another embodiment of the invention.

FIG. 5 is a block diagram of a smart helmet 500 in accordance with another embodiment of the invention. As seen from a side view of helmet 500, any of the cameras 2, 4, and 5 are coupled to a web 510 of strap mountings that are removably mounted on the smart helmet 500. The number of cameras that are coupled to the web 510 may vary. Additionally or optionally, in an embodiment of the invention, one or more microphones 3 and/or other suitable devices may also be coupled to the web 510. The use of the web 510 of strap mountings permits the user to conveniently and quickly attach to (the smart helmet 1) and detach from (the smart helmet 1) the various cameras, microphones, and/or other suitable devices. The package 50 (which contains at least one of the subsystem 6, subsystem 7, subsystem 8, and/or subsystem 9) may also be coupled to the web 510 in one embodiment of the invention. The tensions on the strap mountings are adjustable based on adjustment selectors 515 that are inserted into and locked with the members 520 which are, in turn, securely attached to the bottom rim 525 of the smart helmet 500.

In one embodiment of the invention, a hook 530 can be coupled to (or removably coupled) to the web 510, to member 520, or to a portion of the helmet body 1A (typically near the hat rim 525), as an optional feature. However, in another embodiment of the invention, the hook 530 is omitted.

Figure 6:
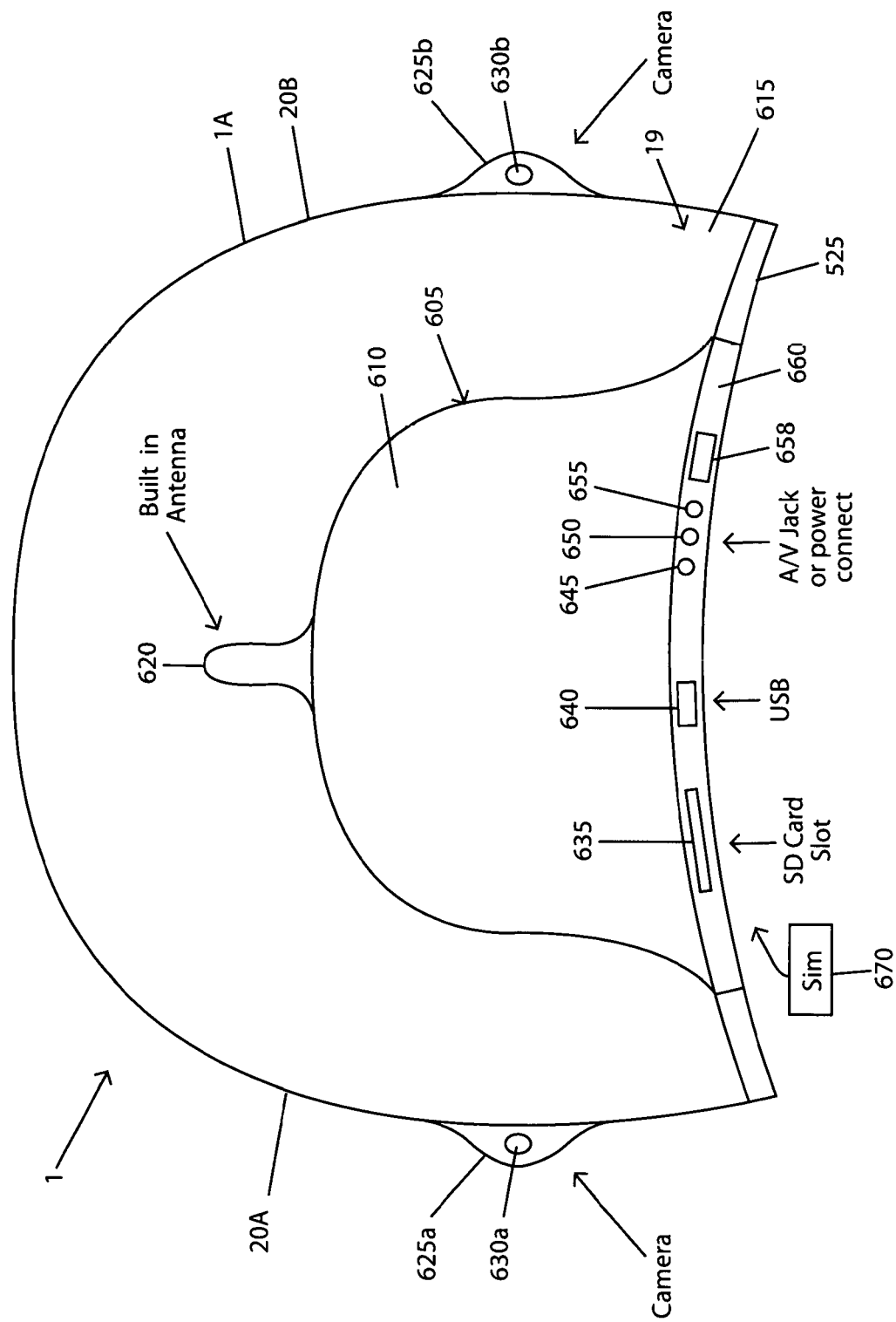
FIG. 6 is a block diagram of a smart helmet in accordance with another embodiment of the invention.

FIG. 6 is a block diagram of a smart helmet in accordance with another embodiment of the invention. The rear helmet portion 19 (or back of the smart helmet 1) is shown in FIG. 6. In an embodiment, a package 605 has a substantially flush configuration or design. In other words, the surface 610 of the package 605 is embedded within the surface 615 of the rear helmet portion 19, or the surface 610 and surface 615 are substantially at the same surface level. The package 605 includes at least one of the subsystem 6, subsystem 7, subsystem 8, and/or subsystem 9. A built-in antennal 620 can also be part of the package 605 and can be configured to be substantially flush or not flush with the surface 615. The antenna 620 is communicatively coupled to the subsystem 6, subsystem 7, subsystem 8, and/or subsystem 9.

In an embodiment of the invention, side mounted cameras 625a and 625b with lens 630a and 630b, respectively, are mounted on the sides of the helmet body 1A. By way of example and not by way of limitation, the cameras 625a and 625b are mounted to the side portions 20A and 20B, respectively. The cameras 625a and 625b can be removably coupled to the side portions 20A and 20B, respectively, or can be integrated with the side portions 20A and 20B, respectively.

In an embodiment of the invention, the side mounted cameras 625a and 625b capture the point of view of the helmet user. The two cameras 625a and 625b can be used to capture images and used to collect and generate 3D video. Any standard method for generating 3D videos from multiple cameras that capture the same image can be used to generate a 3D video from the images captured by cameras 625a and 625b. As known to those skilled in the relevant art(s), commercially available 3D cameras typically use twin lenses to recreate the two eyes of a human.

In an embodiment, the following components can be additionally or optionally included in a smart helmet 1. By way of example and not by way of limitation, the helmet 1 includes a card slot 635, a USB slot 640, and jacks 645, 650, and/or 655. By way of example and not by way of limitation, the card slot 635 is an SD card slot or other types of card slots. By way of example and not by way of limitation, the jack 645 is an A/V jack, while the jack 650 is a power connect jack. The jack 655 can be another type of jack. By way of example and not by way of limitation, the jack 650 can be a connector for a battery charger connector or can be a connector for another function. Any of (or some of) the jacks 645, 650, and/or 655 can be omitted.

In an embodiment, at least one of (or all of) the elements 635, 640, 645, 650, and/or 655 are included within rim portion 660 which is near or adjacent to the hat rim 525. The rim portion 660 can be flush with the surface 615 or can protrude slightly with respect to the surface 615.

In another embodiment, at least one of the elements 635, 640, 645, 650, and/or 655 is included within the rim portion 660, while at least one of the elements 635, 640, 645, 650, and/or 655 is included in the package 605 if that particular element is not included in the rim portion 660.

In another embodiment, at least one of the elements 635, 640, 645, 650, and/or 655 is included in another portion of the helmet 1 such as, for example, the front portion 18, side 20A, or side 203.

In an embodiment of the invention, the power provided to the elements 635, 640, 645, 650, and/or 655 is powered by a power supply 658. In an embodiment, the power supply 658 can be disposed in various positions in the helmet body 1A such as in, for example, the rim portion 525 or another portion of the smart helmet 1. In an embodiment, the power supply 658 can be a single battery, multiple batteries, one or more rechargeable power pack or battery, or a solar cell. Other suitable power storage devices may be used as a power supply 658.

In another embodiment, additionally or optionally, a SIM card 670 from a cell phone can be inserted in the slot 635. The SIM card 670 provides an alternative form of communication via GSM communication or CDMA cell phone communication (instead of WiFi communication) from the smart helmet 1 to a communication destination device.

Other types of input/output (I/O) signal connectors can be additionally or optionally included in the smart helmet 1, in accordance with an embodiment of the invention, depending on the functionality to be performed in the helmet 1.

Figure 7:
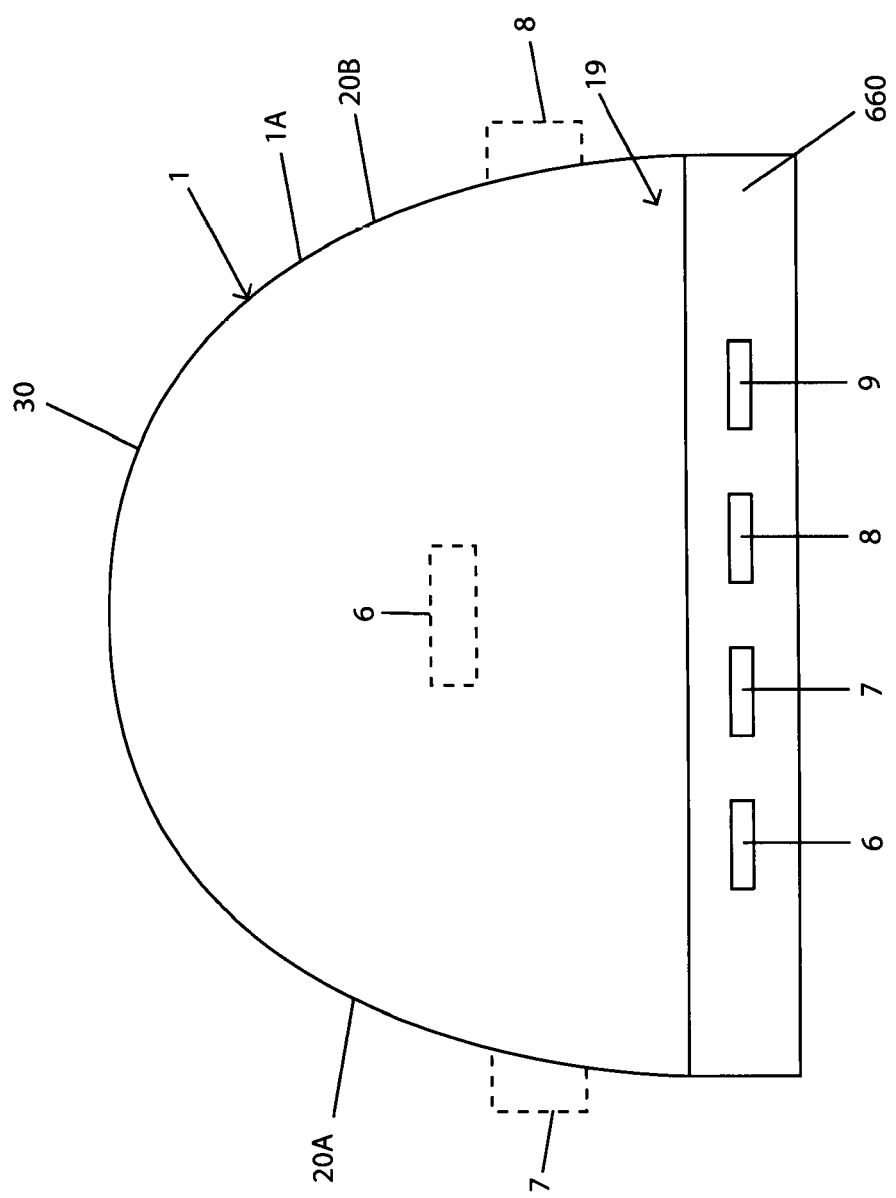
FIG. 7 is a block diagram of a smart helmet in accordance with another embodiment of the invention.

FIG. 7 is a block diagram of a smart helmet in accordance with another embodiment of the invention. At least one or all of the subsystems 6, 7, 8, and/or 9 are included within the rim portion 660. In another embodiment of the invention, at least one of the subsystems 6, 7, 8, and/or 9 are separated from each other and disposed in other parts of the helmet 1. By way of example and not by way of limitation, the subsystem 6 (as shown by dashed box 6), or/and at least another one of the subsystems 7, 8, and/or 9, is disposed in the rear portion 19 or another part of the helmet 1 such as in top portion 1, side 20A, side 20B, or front portion 18.

By way of example and not by way of limitation, the subsystem 7 (as shown by dashed box 7), or/and at least another one of the subsystems 6, 8, and/or 9, is disposed in the left side portion 201\ or another part of the helmet 1 such as in top portion 1, rear portion 19, side 20B, or front portion 18.

By way of example and not by way of limitation, the subsystem 8 (as shown by dashed box 8), or/and at least another one of the subsystems 6, 7, and/or 9, is disposed in the right side portion 20B or another part of the helmet 1 such as in top portion 1, rear portion 19, side 20A, or front portion 18.

In an embodiment of the invention, if any or at least some of the elements 6, 7, 8, and/or 9 are disposed in the rim portions 660, rear portion 19, side 20A, side 208, top portion 1, or/and front portion 18, then any or at least some of these elements can be disposed in grooves in the helmet casing 1A so that these elements are hidden from plain sight or are substantially flush with respect to the surface of the helmet casing 1A. Other variations in the position or configuration of the elements 6, 7, 8, and/or 9 in/on the smart helmet 1 are possible in other embodiments of the invention.

Figure 8:
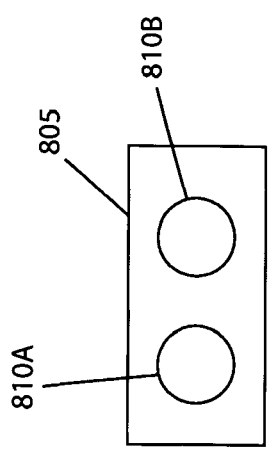
FIG. 8 is a block diagram of a device with multiple cameras in accordance with another embodiment of the invention.

FIG. 8 is a block diagram of a device 805 with multiple cameras 810a and 810b in accordance with another embodiment of the invention. The two cameras 810a and 810b can be used to capture images and used to collect and generate 3D video. Any standard method for generating 3D videos from multiple cameras that capture the same image can be used to generate 3D video from the images captured by cameras 810a and 810b.

Figure 9:
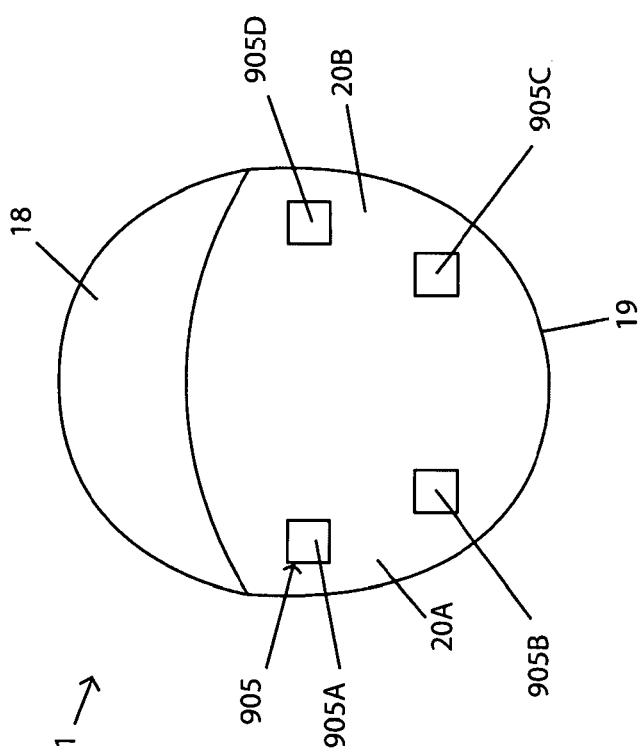
FIG. 9 is a block diagram of a smart helmet in accordance with another embodiment of the invention.

FIG. 9 is a block diagram of a smart helmet 1 in accordance with another embodiment of the invention. Side cameras 905 are coupled to the sides 20A and 20B of the helmet body 1A. By way of example and not by way of limitation, side cameras 905a and 905b are coupled to side 20A and side cameras 905c and 905d are coupled to side 20B. Side cameras 905a and 905d capture the images in the POV of user and facing the helmet front portion 18. Side cameras 905b and 905c capture the images in the rear of the smart helmet 1 and facing the helmet rear portion 19.

In another embodiment of the invention, the smart helmet 1 includes the front-facing cameras 905a and 905d and the rear-facing cameras 905b and 905c are omitted.

In an embodiment, the cameras 905 (e.g., cameras 905a, 905b, 905c, and/or 905d) are positioned relatively lower and substantially at an eye level position of the user. This position of the cameras 905 advantageously avoids goggle interference and provides an eye level view of the captured images (i.e., the captured images are the same images viewed by a participant wearing the helmet such as, for example, a jockey).

The two front-facing cameras 905a and 905b can generate a 3D image of views captured in the front of the smart helmet 1. The two rear-facing cameras 905b and 905c can generate a 3D image of views captured in the rear of the smart helmet 1.

FIG. 10 is a block diagram of a smart helmet in accordance with another embodiment of the invention. The smart system 52 in the helmet 1 is tethered to a cell phone 1005 for access to a wide area network 45 such as, for example, the Internet. A cell phone 1005 includes a SIM card and a WiFi receiver and WiFi transmitter (or alternatively includes a WiFi transceiver). The cell phone 1005 is configured to use a typical cell phone signaling technology (e.g., GSM, CDMA, LTE, or other suitable wireless methods). Therefore, there is a WiFi connection 1006 between the smart helmet 1 and the cell phone 1005 and there is a cellular wireless connection 1008 between the cell phone 1005 and a cell tower 1009.

In an embodiment of the invention, the cell phone 1005 includes software 1010 that receives digital data 1015 via WiFi from the smart system 52 and that transmits (or effectively "routes") the digital data 1015 to the communications network 54 via the cell phone connection 1008 to the cell tower 1009. The destination devices will receive the signals transmitting along the network 54 as similarly discussed above.

As discussed above, the communications network 54 can be, by way of example and not by way of limitation, the Internet, a local area network, a private area network, or another suitable communications network.

New data 1025 that needs to be transmitted to the smart helmet 1 (and smart system 52) is also received by the cell phone 1005 from the cell tower 1009, and the same software 1010 (which sent the digital data 1015 from the smart system 52 to the cell tower 1009) also now sends new data 1025 back to the smart system 52 via the WiFi connection 1006 between the smart helmet 1 and the cell phone 1005.

Cell phone tethering, as discussed with reference to FIG. 10, might be useful where the cameras on the smart helmet 1 (e.g., camera 2 or other cameras) can communicate to the Internet-based servers using WiFi to connect to a cell phone 1005 and then the cell phone 1005 transmits the signals across the Internet.

Figure 11:
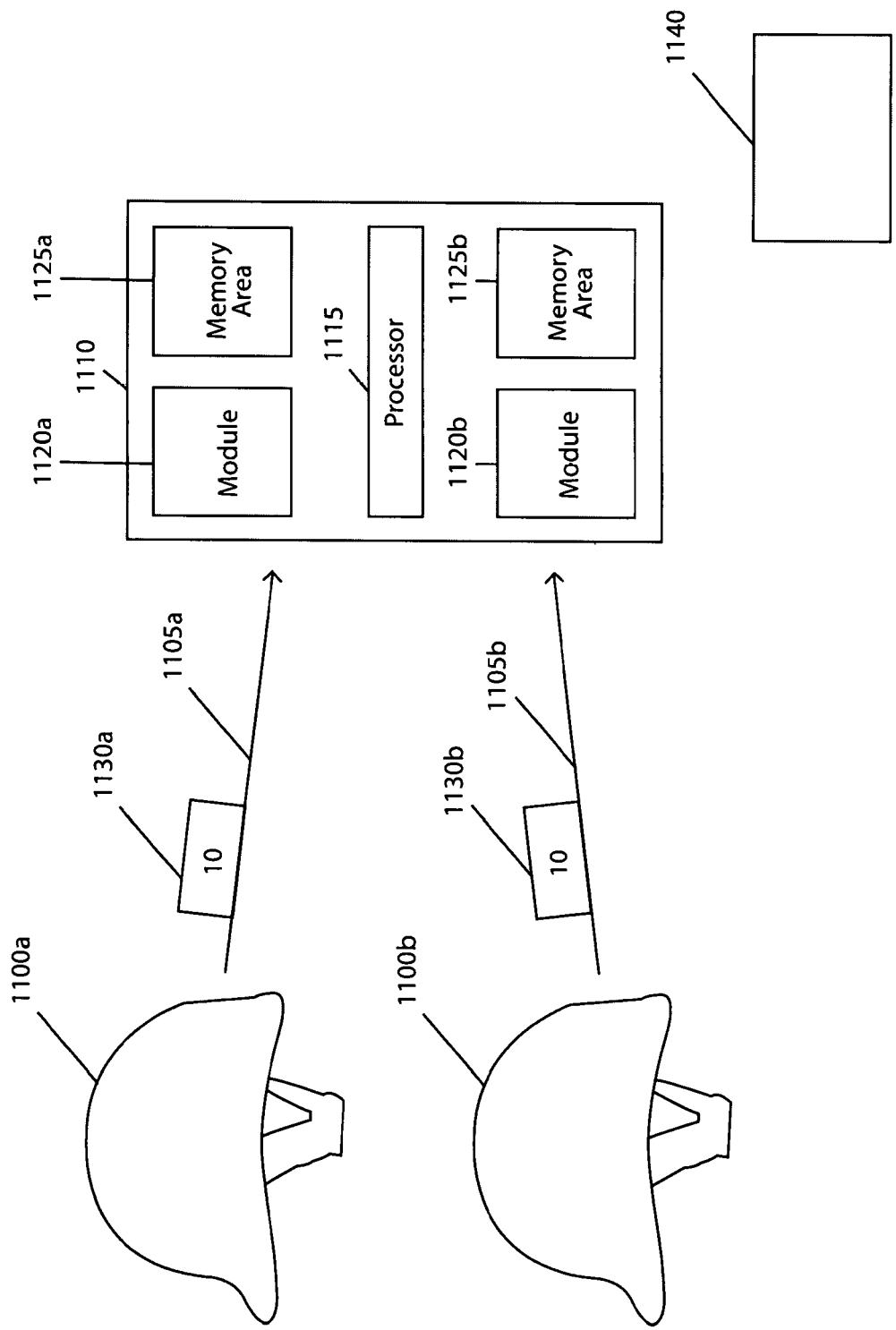
FIG. 11 is a block diagram of smart helmets in accordance with another embodiment of the invention.

FIG. 11 is a block diagram of multiple smart helmets 1100a and 1100b in accordance with another embodiment of the invention. The helmets 1100a and 1100b transmits the signals 1105a and 1105b, respectively. Each signal 1105a and/or 1105b includes video data captured by cameras as discussed above. The signal 1105a and/or 1105b can also include audio data, positional data, and/or telemetric data as also discussed above.

In an embodiment of the invention, a server 1110 receives the signals 1105a and 1105b. As shown in FIG. 11, the server 1110 is remote from the smart helmets 1100a and 1100b. Therefore, the smart helmets 1100a and 1100b transmit the signals 1105a and 1105, respectively, to the server 1110 via wireless communications.

In an embodiment, the server 1110 includes a processor 1115 that executes any software and/or firmware used by the server 1110. Computing elements that are known to those skilled in the relevant art(s) are not shown in the server 1110 for purposes of focusing the discussion on embodiments of the invention.

Each smart helmet is allocated (or dedicated) to an active listener module that waits for and processes incoming data from its assigned smart helmet. For example, the active listener module 1120a is allocated to the smart helmet 1100a, while the active listener module 1120b is allocated to the smart helmet 1100b. Typically, the active listener modules 1120a and 1120b are executed by the processor 1115 and are stored in a memory in the server 1120a or are stored in an external memory that is accessible by the server 1120a.

In an embodiment, the module 1120a will store or buffer all communications 1105a (from helmet 1100a) into the memory area 1125a, while the module 1120b will store or buffer all communications 1105b (from helmet 1100b) into the memory area 1125b. The subsequent processing of communications from a server to the end user device has been described above with reference to FIG. 2.

Each active listener module can identify and will then subsequently process communications from its dedicated smart helmet based on an identifier in the communications. By way of example and not by way of limitation, the active listener 1120a identifies the communication 1105a as transmitted by its dedicated smart helmet 1100a based on the identifier 1130a in the communications 1105a. The identifier 1130a can be, by way of example and not by way of limitation, a frequency value or a node address assigned to the smart helmet 1100a. The active listener 1120b identifies the communication 1105b as transmitted by its dedicated smart helmet 1100b based on the identifier 1130b.

The active listener modules 1120a and 1120b can be programmed in a suitable programming language and by use of suitable programming methods. If the active listener modules are programmed in the Erlang programming language, then the active listener modules are called "processes". If the active listener modules are programmed in C++ or in Java, then the active listener modules are called "threads".

In another embodiment of the invention, each smart helmet is dedicated to a corresponding server. By way of example and not by way of limitation, in this other embodiment, the smart helmet 1100a sends the communications 1105a to the server 1110 and the smart helmet 1100b sends the communications 1105b to the server 1140. The servers 1110 and 1140 can be two servers in a server fabric 225 as described above with reference to FIG. 1.

Figure 12:
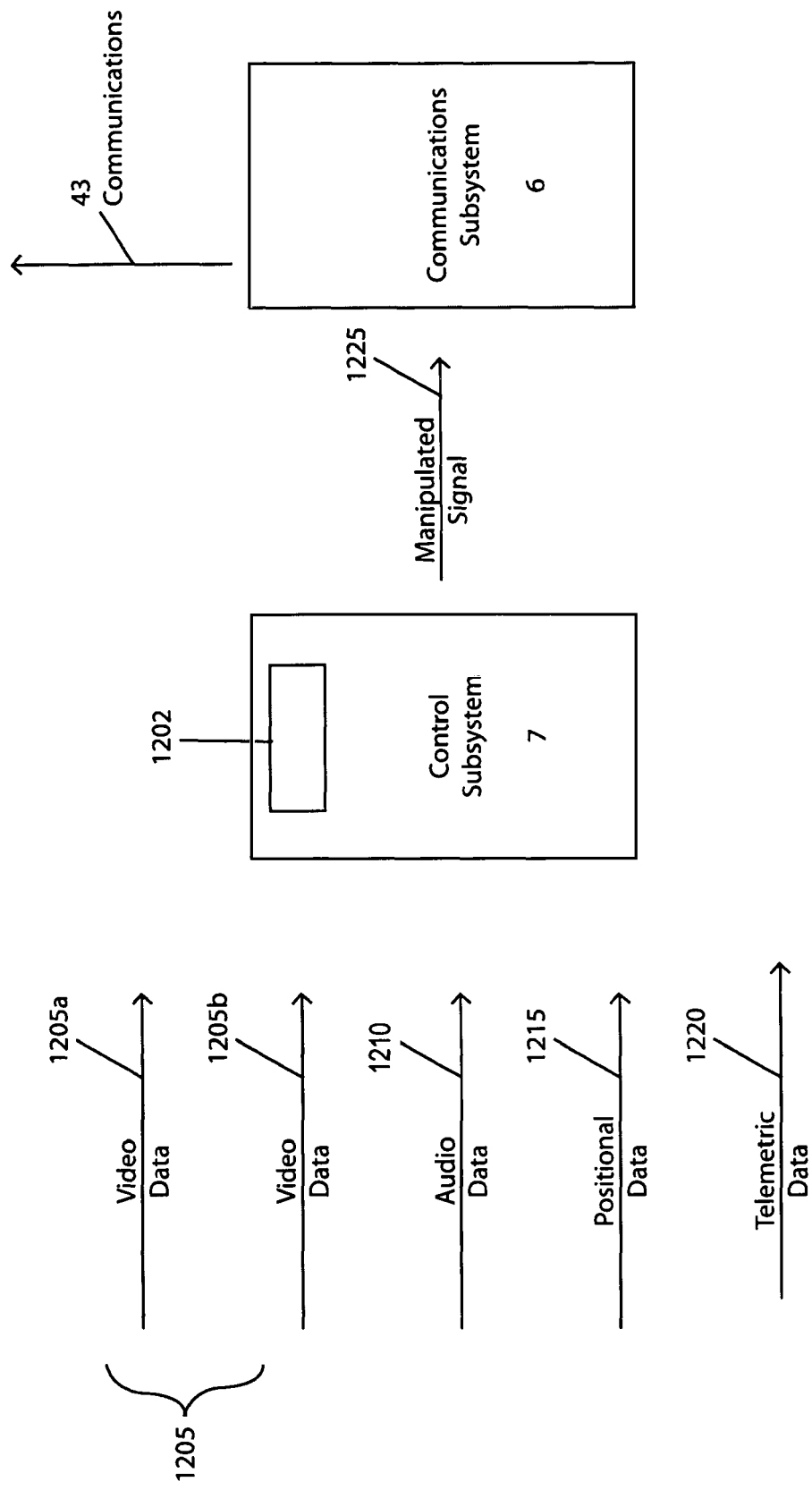
FIG. 12 are block diagrams of the processing of the signals as performed by the control subsystem in accordance with another embodiment of the invention.

FIG. 12 are block diagrams of the processing of the signals as performed by the control subsystem in accordance with another embodiment of the invention. One or more video data (e.g., video data 1205a alone, or multiple video data 1205a and 1205b) are received and processed by the control subsystem 7. By way of example and not by way of limitation, one or more audio data 1210, positional data (e.g., GPS data) 1215, and/or one or more telemetric data 1220 are also received and processed by the control subsystem 7.

The control subsystem 7 will apply signal manipulation on the one or more video data 1205 and, if present, on the one or more audio data 1210, positional data 1215, and/or one or more telemetric data 1220. The control subsystem 7 outputs the manipulated signal after performing the signal manipulation. The control subsystem 7 includes the controller 1202 for executing software modules and/or performing other functions involved in the signal manipulation. In an embodiment, the signal manipulation involves altering, multiplexing, stitching, interleaving, transcoding, encoding, modulation, formatting, and/or other manipulation of the data received by the control subsystem 7, depending on the format of the received data.

The control subsystem 7 transmits the manipulated signal 1225 to the communication subsystem 6. The communication subsystem 6 then wirelessly transmits the manipulated signal 1225 within the communications 43 that will be received by destination devices as discussed with reference to FIGS. 1A and 2. As discussed above, the communications 43 can be a modulated wireless signal, packets, streamed data, cellular phone signals and/or other types of suitable communication signals.

In another embodiment of the invention, for a control subsystem 7 that includes (or embodied as) an analog control subsystem, video and audio data may be transmitted directly from the cameras and microphones by the communication subsystem 6 or routed through the control subsystem 7 that converts the analog data (by use of alteration or multiplexing) before transmission. Other variations of features are possible in other embodiments of the invention.

Figure 13:
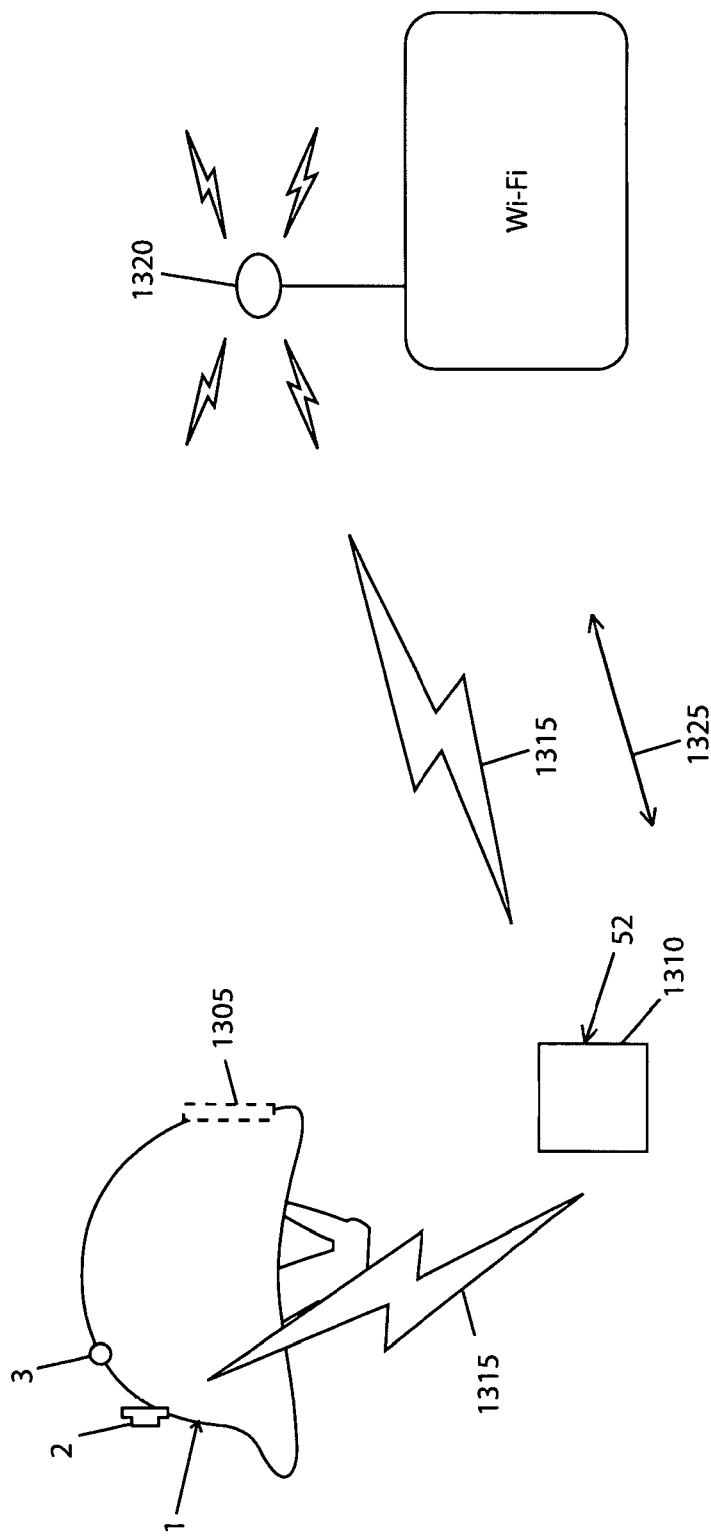
FIG. 13 is a block diagram of a smart helmet in accordance with another embodiment of the invention.

FIG. 13 is a block diagram of a smart helmet in accordance with another embodiment of the invention. In this embodiment, the smart system 52 is remotely displaced (or remotely disposed) from the smart helmet 1. In the above-discussed embodiments, the smart system 52 is coupled to the smart helmet 1 in an adjacent position 1305. As discussed above, the smart system 52 can include the communications subsystem 6, the control subsystem 7, the GPS subsystem 8, and/or the telemetry subsystem 9 in an embodiment of the invention, and the GPS subsystem 8 and/or telemetry subsystem 9 can be omitted in other embodiments of the invention.

In the embodiment shown in FIG. 13, the smart system 52 is remote from (or moved off) the helmet 1 and included in the box 1310. The helmet 1 will include at least one camera 2 and may also include the microphone 3. As discussed above, the microphone 3 may be omitted in other embodiments of the smart helmet 1. The helmet 1 can also include additional cameras.

The cameras (e.g., camera 2) will broadcast on a standard radio frequency (e.g., approximately 2.4 GHz) and the broadcast 1315 is received by the box 1310 (and smart system 52) using an RF receiver. The cameras transmit their video using radio waves over the short distance between the helmet 1 and the box 1310. The rider (or another user) still carries the box 1310. As an example, the box 1310 is in a saddle mounted position (or is removably attached to the body or clothing of the user) rather than being built into (or attached to) the helmet 1. Therefore, in other embodiments of the invention, the smart system 52 (with its communications subsystem 6 and control subsystem 7) need not be physically mounted to the helmet 1 and is instead remotely disposed from the helmet 1. This embodiment advantageously permits the following for the smart helmet 1: (a) a simplified construction, (b) a reduced weight, (c) an ease of replacing components, (d) a reduced cost of helmets, and/or (e) other possible advantages.

In FIG. 13, the analog cameras (e.g., camera 3) would transmit their signals 1315 (e.g., video) to the smart system 52 in the remote box 1310. The microphone 3 would also transmit their signals 1315 (e.g., voice signals) to the smart system 52 if the microphone 3 is included in the smart helmet 1. The smart system 52 would then wirelessly transmit the signals 1315 to a destination node 1320 as similarly discussed above. The communication link 1325 between the smart system 52 and the node 1320 can be, for example, a WiFi connection as similarly discussed above. The signals 1315 are analog signals because the cameras and microphone are transmitting their signals in a manner similar to standard television broadcast signals or standard radio broadcast signals, respectively, and are not transmitting along a digital link.

Figure 14:
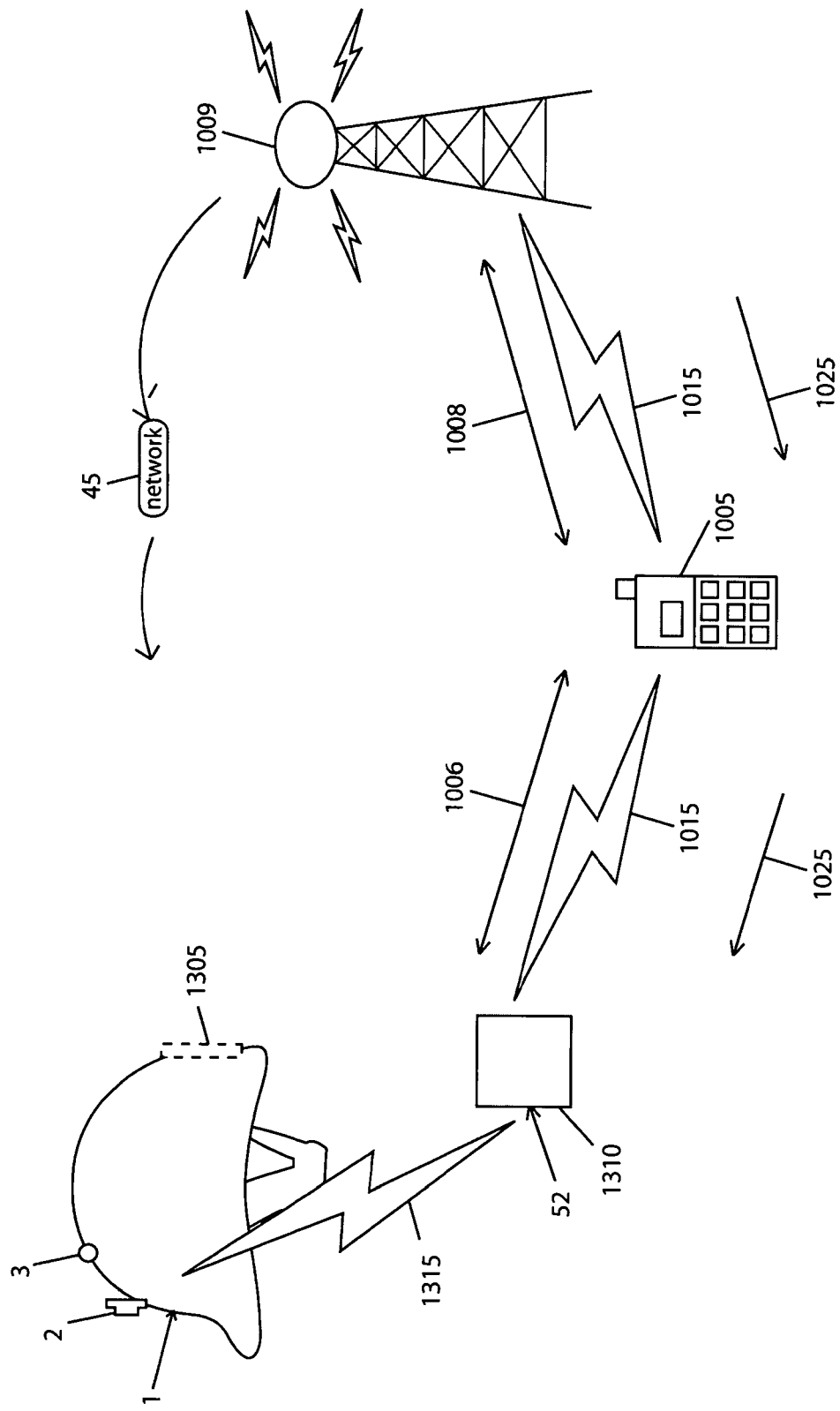
FIG. 14 is a block diagram of a smart helmet in accordance with another embodiment of the invention.

FIG. 14 is a block diagram of a smart helmet in accordance with another embodiment of the invention. The smart system 52 is included in a box 1310 that is remotely disposed from the helmet 1 as similarly discussed above with reference to FIG. 13. The smart system 52 is tethered to the cell phone 1005 as similarly discussed above with respect to FIG. 10. Therefore, the smart system 52 (which is remotely disposed from the helmet 1) receives the signals 1315 from the camera 2 and/or microphone 3 on the helmet 1, and the smart system 52 communicates these signals 1315 as Wi-Fi signals 1015 to the cell phone 1005. The cell phone 1005 then transmits these signals 1015 to the cell tower 1009 as previously discussed above. The cell tower 1009 then transmits these signals 1015 to the network 45 for routing to destination devices.

FIG. 15 is a block diagram of an exemplary wireless system 1500 that can be used to transmit wireless signals in an embodiment of the invention. The system 1500 is commonly-known as a SuperWifi system 1500. The smart helmet 1 (and smart system 52) in the smart helmet 1 are configured to transmit the wireless signals to destination devices as similarly discussed above. The system 1500 includes a base station 1505 and a white space antenna 1510. The station 1505 and antenna 1510 may be implemented in a structure 1515 (e.g., a building). The system 1500 also includes a terminal 1520 and an infrastructure 1525 for permitting broadband communications (e.g., 1525 MB/s Broadband communications). The terminal 1520 and infrastructure 1525 may be implemented in a second structure 1530 (e.g., a house or private residence). The components in the infrastructure 1525 are known to those skilled in the art. The station 1505 and antenna 1510 along with the terminal 1520 and infrastructure 1525 can perform wireless communication 1535 between the first structure 1515 and the second structure 1530. By way of example only, the range of this wireless communication 1525 can be as much as approximately 10 kilometers. TV White Spaces "SuperWifi" (TVWS) are vacant frequencies made available for unlicensed use at locations where spectrum is not being used by licensed services, such as television broadcasting. This spectrum is located in the VHF (54-216 MHz) and UHF (470-698 MHz) bands and has characteristics that make it highly desirable for wireless communication Those skilled in the art will realize, after reading the discussion herein, that other suitable materials or combination of suitable materials can be used for the components in the smart helmets disclosed herein. Those skilled in the art will also realize, after reading the discussion herein, that the assembly, manufacture, and/or construction of the components of a smart helmet disclosed herein may be selectively varied based on cost, ease of manufacturing, or/and other considerations. Additionally, the parts or components in a smart helmet can be suitably varied or substituted with other parts or components or shapes, as manufacturing and parts technologies improve in the future.

Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a smart headgear comprising:
a plurality of cameras comprising a front facing camera, a rear facing camera, a first side facing camera, and a second side facing camera, wherein the second side facing camera is opposite to the first side facing camera, wherein the front facing camera generates a first video data, the rear facing camera generates a second video data, the first side facing camera generates a third video data, and the second side facing camera generates a fourth video data,
wherein the first video data, the second video data, third video data, and fourth video data provide a 360 degree view around the smart headgear, and wherein the 360 degree view is seen from a perspective viewed from the smart headgear,
wherein the front facing camera, rear facing camera, first side facing camera, and second side facing camera are each coupled to the smart headgear,
a communication subsystem directly coupled to and directly positioned on the smart headgear,
a control subsystem directly coupled to and directly positioned on the smart headgear, and
a link directly coupled to and directly positioned on the smart headgear, wherein the link communicatively couples the cameras, the communication subsystem, and the control sub system,
wherein the control subsystem is configured to process each video data from the cameras into a manipulated signal and the communication subsystem is configured to wirelessly transmit the manipulated signal from the smart headgear to a destination device and wherein the manipulated signal provides the 360 degree view that is seen from the perspective viewed from the smart headgear;
wherein the control subsystem manipulates the first video data, second video data, third video data, and fourth video data into the manipulated signal comprising a wireless data stream having a transmittable encoding format, and wherein the control subsystem generates the manipulated signal prior to the communication subsystem wirelessly transmitting the manipulated signal from the smart headgear to the destination device; and
wherein the wireless data stream comprises a wireless data streaming video that shows the 360 degree view.

2. The apparatus of claim 1, wherein the manipulated signal provides a virtual experience perspective and an immersive-style video.

3. The apparatus of claim 1, further comprising: a microphone coupled to the smart headgear and configured to capture audio data.

4. The apparatus of claim 1, wherein the destination device comprises a server.

5. The apparatus of claim 1, wherein the smart headgear comprises:
a head-mount portion and a shell that is removably coupled to the head-mount portion; and
wherein the cameras, the communication subsystem, and the control subsystem are each mounted on the shell.

6. The apparatus of claim 1, wherein the smart headgear includes a package embedded on a surface of the smart headgear and wherein the package includes at least one of the communication subsystem and the control subsystem.

7. The apparatus of claim 1, further comprising: a telemetry subsystem coupled to the smart headgear and configured to capture telemetric data.

8. The apparatus of claim 1, wherein the destination device comprises a mobile telephone.

9. The apparatus of claim 1, wherein the manipulated signal is transmitted at TV White Spaces (TVWS) frequencies.

10. A method, comprising:
generating, by a front facing camera, a first video data; generating, by a rear facing camera, a second video data; generating, by a first side facing camera, a third video data; generating, by a second side facing camera, a fourth video data;
wherein the second side facing camera is opposite to the first side facing camera;
wherein the front facing camera, rear facing camera, first side facing camera, and second side facing camera are each coupled to a smart headgear;
wherein the rear facing camera is 180 degrees from the front facing camera and wherein the front facing camera provides a point of view (POV) of a wearer of the smart headgear;
wherein the first video data, the second video data, third video data, and fourth video data provide a 360 degree view around the smart headgear, and wherein the 360 degree view is seen from a perspective viewed from the smart headgear;
processing, by a control subsystem directly coupled to and directly positioned on the smart headgear, each video data from the cameras into a manipulated signal; and
wirelessly transmitting, by a communication subsystem directly coupled to and directly positioned on the smart headgear, the manipulated signal from the smart headgear to a destination device and wherein the manipulated signal provides the 360 degree view that is seen from the perspective viewed from the smart headgear;
wherein the smart headgear comprises a link that is directly coupled to and directly positioned on the smart headgear, wherein the link communicatively couples the cameras, the communication subsystem, and the control subsystem;
wherein the control subsystem manipulates the first video data, second video data, third video data, and fourth video data into the manipulated signal comprising a wireless data stream having a transmittable encoding format, and wherein the control subsystem generates the manipulated signal prior to the communication subsystem wirelessly transmitting the manipulated signal from the smart headgear to the destination device; and
wherein the wireless data stream comprises a wireless data streaming video that shows the 360 degree view.

11. The method of claim 10, wherein the manipulated signal provides a virtual experience perspective and an immersive-style video.

12. The method of claim 10, wherein the destination device comprises a mobile telephone.

13. The method of claim 10, further comprising: capturing, by a microphone coupled to the smart headgear, audio data.

14. The method of claim 10, wherein the destination device comprises a server.

15. The method of claim 10, further comprising: capturing, by a telemetric subsystem coupled to the smart headgear, telemetric data.

16. The method of claim 10, wherein wirelessly transmitting the manipulated signal comprises: transmitting the manipulated signal at TV White Spaces (TVWS) frequencies.

* * * * *